US012776502B2

(12) United States Patent
Suzuki et al.

(10) Patent No.: US 12,776,502 B2
(45) Date of Patent: Oct. 27, 2026

(54) FUEL CELL CONTROL PROGRAM AND FUEL CELL SYSTEM

(71) Applicants: KABUSHIKI KAISHA TOYOTA CHUO KENKYUSHO, Nagakute (JP); TOYOTA JIDOSHA KABUSHIKI KAISHA, Toyota (JP)

(72) Inventors: Masao Suzuki, Nagakute (JP); Naoki Kitano, Nagakute (JP); Masahiro Imanishi, Gotemba (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 678 days.

(21) Appl. No.: 18/277,151

(22) PCT Filed: Feb. 17, 2022

(86) PCT No.: PCT/JP2022/006503
§ 371 (c)(1),
(2) Date: Aug. 14, 2023

(87) PCT Pub. No.: WO2022/224569
PCT Pub. Date: Oct. 27, 2022

(65) Prior Publication Data

US 2024/0186550 A1 Jun. 6, 2024

(30) Foreign Application Priority Data

Apr. 19, 2021 (JP) ................................ 2021-070506

(51) Int. Cl.
*H01M 8/04992* (2016.01)
*H01M 8/0444* (2016.01)
(Continued)

(52) U.S. Cl.
CPC ..... *H01M 8/04992* (2013.01); *H01M 8/0444* (2013.01); *H01M 8/04746* (2013.01);
(Continued)

(58) Field of Classification Search
CPC .. H01M 8/04992; H01M 8/00; H01M 8/0444; H01M 8/04746; H01M 8/04828;
(Continued)

(56) References Cited

U.S. PATENT DOCUMENTS

2013/0095402 A1* 4/2013 Furuyama ......... H01M 8/04791 429/427

FOREIGN PATENT DOCUMENTS

JP 2016-126932 A 7/2016
JP 2016-134375 A 7/2016

OTHER PUBLICATIONS

Kienitz et al., "Cationic Contamination Effects on Polymer Electrolyte Membrane Fuel Cell Performance," Journal of the Electrochemical Society, 2011, vol. 158, No. 9, pp. B1175-B1183.
(Continued)

*Primary Examiner* — Karie O'Neill Apicella
(74) *Attorney, Agent, or Firm* — Oliff PLC

(57) ABSTRACT

Based on an operation condition φ(t) of a polymer electrolyte fuel cell at a time t, the concentration distribution of a radical generation ion and the concentration distribution of a radical scavenging ion in an electrolyte membrane are estimated. Next, a load command p(t+Δt) at a time (t+Δt) is acquired. Next, a reference operation condition $\varphi^{ref}(t+\Delta t)$ under which the load command p(t+Δt) can be realized is acquired. Next, whether or not a judgment index exceeds a first threshold value $\varepsilon_1$ is judged. When the judgment index exceeds $\varepsilon_1$, an operation condition which is different from $\varphi^{ref}(t+\Delta t)$ and gives the judgment index of $\varepsilon_1$ or less is selected as φ(t+Δt). On the other hand, when the judgment
(Continued)

index does not exceed $\varepsilon_1$, $\varphi^{ref}(t+\Delta t)$ is selected as $\varphi(t+\Delta t)$. The fuel cell system has a control device for performing such treatments.

17 Claims, 5 Drawing Sheets

(51) Int. Cl.
*H01M 8/04746* (2016.01)
*H01M 8/04828* (2016.01)
*H01M 8/04858* (2016.01)
*H01M 8/1018* (2016.01)

(52) U.S. Cl.
CPC ... *H01M 8/04828* (2013.01); *H01M 8/04865* (2013.01); *H01M 8/04895* (2013.01); *H01M 8/1018* (2013.01)

(58) Field of Classification Search
CPC ......... H01M 8/04858; H01M 8/04865; H01M 8/04892; H01M 8/10; H01M 8/1018
See application file for complete search history.

(56) References Cited

OTHER PUBLICATIONS

Shibata et al., "A Theoretical and Experimental Study on Electrochemical Impedance Spectra of Polymer Electrolyte Membrane Fuel cells for Cation Content Estimation," Journal of the Electrochemical Society, 2020, vol. 167, 134513.
May 10, 2022 International Search Report issued in International Patent Application No. PCT/JP2022/006503.
May 10, 2022 Written Opinion of the International Searching Authority issued in International Patent Application No. PCT/JP2022/006503.

* cited by examiner

FUEL CELL CONTROL PROGRAM AND FUEL CELL SYSTEM

FIELD OF THE INVENTION

The present invention relates to a fuel cell control program and a fuel cell system and more specifically, relates to a fuel cell control program capable of suppressing the deterioration of an electrolyte due to a radical and a fuel cell system equipped with this program.

BACKGROUND OF THE INVENTION

A polymer electrolyte fuel cell has a membrane electrode assembly (MEA) in which a catalyst layer is bonded to both sides of an electrolyte membrane. Usually, a gas diffusion layer is disposed outside the catalyst layer. Further, a separator (also called "current collector") equipped with a gas flow path is disposed outside the gas diffusion layer. The polymer electrolyte fuel cell usually has a structure (fuel cell stack) in which a plurality of unit cells each including such MEA, the gas diffusion layer, and the separator are stacked one after another.

During the operation of a polymer electrolyte fuel cell, hydrogen peroxide is generated in an anode catalyst layer and the Fenton reaction converts this hydrogen peroxide into an ·OH radical. The resulting ·OH radical is known to deteriorate an electrolyte in the MEA. The deterioration in electrolyte becomes a cause for reducing the durability of the fuel cell or for reducing the power generation performance of the fuel cell. In order to overcome this problem, various proposals have therefore been made conventionally.

For example, Patent Literature 1 discloses a fuel cell system, though it is not intended for suppressing the deterioration of an electrolyte due to a radical, when a difference between a pressure of a fuel gas to be introduced into a fuel cell and a pressure of an oxidizing agent gas to be discharged from the fuel cell is a predetermined value or more:

(a) that reduces the pressure of a hydrogen gas when the humidity of a membrane electrode assembly is a first threshold value or more, and (b) that increases the pressure of air when the humidity of the membrane electrode assembly is less than the first threshold value.

The Literature describes the following points:

(A) when there is a large difference between a pressure in a hydrogen flow path on an anode side and a pressure in an oxygen flow path on a cathode side, this pressure difference may cause deformation of MEA, (B) a simple reduction in a pressure difference between electrodes in order to suppress the deformation of MEA may cause drying-up or flooding, (C) a reduction in hydrogen gas pressure at the time when the humidity of MEA is a first threshold value or more reduces the pressure difference between electrodes and at the same time, prevents flooding because a saturated steam quantity of a hydrogen gas increases and the humidity of MEA decreases; and (D) an increase in air pressure at the time when the humidity of MEA is less than the first threshold value reduces the pressure difference between electrodes and at the same time, prevents drying-up because the saturated steam quantity of air decreases and the humidity of MEA increases.

Using the method described in Patent Literature 1 makes it possible to suppress a mechanical-stress-induced deterioration of an electrolyte membrane. However, the method described in Patent Literature 1 is not able to suppress the radical-induced deterioration of an electrolyte. Further, an example of a fuel cell control method capable of suppressing the radical-induced electrolyte deterioration has not conventionally been proposed.

CITATION LIST

Patent Literature

[Patent Literature 1] Japanese Unexamined Patent Application Publication No. 2016-126932

SUMMARY OF THE INVENTION

A problem to be solved by the present invention is to provide a fuel cell control program capable of suppressing the radical-induced deterioration of an electrolyte membrane by controlling operation condition.

Another problem to be solved by the present invention is to provide a fuel cell system equipped with such a fuel cell control program.

In order to overcome the aforesaid problems, the fuel cell control program according to the present invention has a program for having a computer perform the following procedures.

(A) Procedure A of estimating, based on an operation condition $\varphi(t)$ at a time t of a polymer electrolyte fuel cell containing, in an electrolyte membrane thereof, a radical generating ion and a radical scavenging ion, a concentration distribution $C_g(z,t)$ of the radical generating ion and a concentration distribution $C_g(z,t)$ of the radical scavenging ion (z means a membrane-thickness direction position in the electrolyte membrane) in the electrolyte membrane and storing the concentration distributions in a memory, (B) Procedure B of acquiring a load command $p(t+\Delta t)$ at a time $(t+\Delta t)$ and storing the load command in the memory, (C) Procedure C of acquiring a reference operation condition $\varphi^{ref}(t+\Delta t)$ under which the load command $\varphi(t+\Delta t)$ can be realized and storing the reference operation condition in the memory, (D) Procedure D of judging whether or not a judgment index $f_1(C_g(z,t), C_s(z,t))$ including the $C_g(z,t)$ and/or the $C_s(z,t)$ exceeds a first threshold value $\varepsilon_1$ (or is $\varepsilon_1$ or more), and (E) Procedure E of selecting, as the $\varphi(t+\Delta t)$, an operation condition which is different from the $\varphi^{ref}(t+\Delta t)$ and under which the $f_1(C_g(z,t), C_s(z,t))$ is not more than the $\varepsilon_1$ (or is less than the $\varepsilon_1$) when the $f_1(C_g(z,t), C_s(z,t))$ is judged to exceed the $\varepsilon_1$ (or is judged to be the $\varepsilon_1$ or more) in the Procedure D and selecting, as the $\varphi(t+\Delta t)$, the $\varphi^{ref}(t+\Delta t)$ when the $f_1(C_g(z, t), C_s(z,t))$ is judged not to exceed the $\varepsilon_1$ (or is judged not to be the $\varepsilon_1$ or more) in the Procedure D.

The fuel cell system according to the present invention includes:

a polymer electrolyte fuel cell, a secondary battery for storing surplus electricity generated by the polymer electrolyte fuel cell, and a control device for controlling an operation of the polymer electrolyte fuel cell and the secondary battery, wherein the control device has a fuel cell control program according to the present invention housed therein.

The fuel cell control program according to the present invention:

(a) successively estimates a concentration distribution $C_g(z,t)$ of a radical generating ion and a concentration distribution $C_s(z,t)$ of a radical scavenging ion in an electrolyte membrane at a time t (Procedure A), (b) judges whether or not a locally concentrated region of the radical generating ion is formed (in other words, judges whether or not the judgment index $f_1(C_g(z,t), C_s(z,t))$ exceeds a first threshold value $\varepsilon_1$) when an operation condition is changed (in other words, when a load demand $p(t+\Delta t)$ at a time $(t+\Delta t)$ is acquired) and the changed operation condition is performed as is (Procedures B to D), and (c) selects an operation condition different from a reference operation condition $\varphi^{ref}(t+\Delta t)$ which is to be determined based on the load command $p(t+\Delta t)$ (in other words, selects an operation condition capable of mitigating the local concentration of the radical generating ion), when it is judged that there is a high possibility of a region in which the radical generating ion is locally concentrated being formed (Procedure E).

Even if there is a change in potential gradient, ion concentration gradient, humidity gradient, or the like which may occur in the electrolyte membrane during the operation of the fuel cell, therefore, it is possible to suppress the deterioration of the electrolyte membrane caused by the temporary formation of a region in which the radical generating ion is concentrated.

DETAILED DESCRIPTION OF PREFERRED EMBODIMENTS

Figure 1:
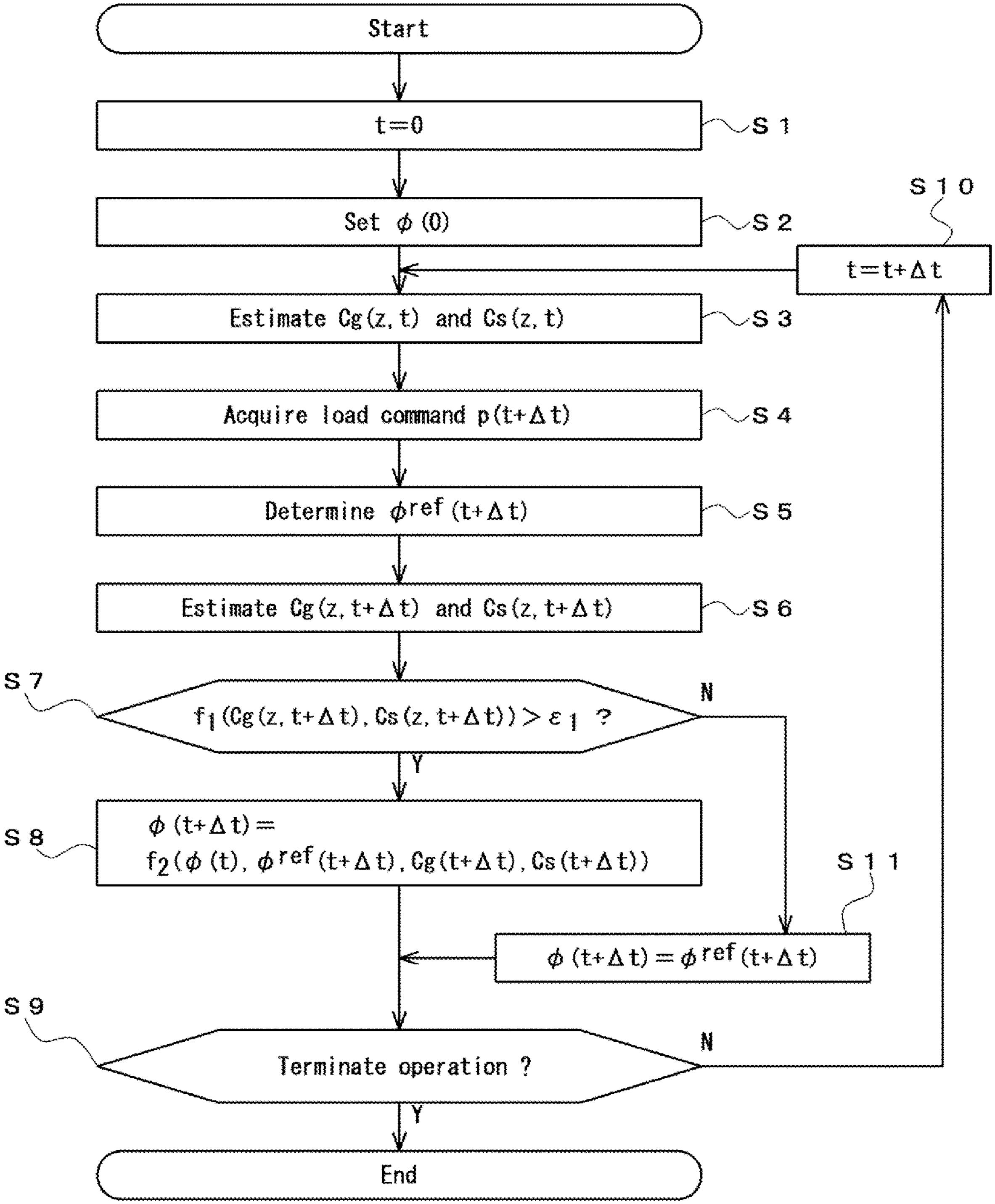
FIG. 1 is a flow chart of the fuel cell control program according to the present invention.

One embodiment of the present invention will hereinafter be described in detail.

1. Variable

Table 1 shows a list of variables used herein.

TABLE 1

| | |
|---|---|
| t | time |
| $\Delta t$ | time increment |
| p | load command |
| Cg | concentration distribution of radical generating ion |
| Cs | concentration distribution of radical scavenging ion |
| $\phi$ | operation condition |
| I | current |
| V | voltage |
| $RH_{ca}$ | relative humidity of cathode gas |
| $RH_{an}$ | relative humidity of anode gas |
| $P_{ca}$ | pressure of cathode gas |
| $P_{an}$ | pressure of anode gas |
| $Q_{ca}$ | flow rate of cathode gas |
| $Q_{an}$ | flow rate of anode gas |
| $\phi^{ref}$ | reference operation condition |
| $I^{ref}$ | reference current |
| $V^{ref}$ | reference voltage |
| $RH_{ca}^{ref}$ | reference relative humidity of cathode gas |
| $RH_{an}^{ref}$ | reference relative humidity of anode gas |
| $P_{ca}^{ref}$ | reference pressure of cathode gas |
| $P_{an}^{ref}$ | reference pressure of anode gas |
| $Q_{ca}^{ref}$ | reference flow rate of cathode gas |
| $Q_{an}^{ref}$ | reference flow rate of anode gas |

2. Fuel Cell Control Program

The fuel cell control program according to the present invention has a program for having a computer perform the following procedures.

2.1. Procedure A

First, based on an operation condition $\varphi(t)$ at a time t of a polymer electrolyte fuel cell containing, in an electrolyte membrane thereof, a radical generating ion and a radical scavenging ion, a concentration distribution $C_g(z,t)$ of the radical generating ion and a concentration distribution $C_g(z,t)$ of the radical scavenging ion (z represents a membrane-thickness-direction position of the electrolyte membrane and when z=0, the position is an anode-side end portion and when z=L, the position is a cathode-side end portion) are estimated and they are stored in a memory (Procedure A).

A metal ion in the electrolyte membrane is known to move according to a potential gradient, an ion concentration gradient, and a humidity gradient (refer to Reference Literature 1 and 2). When the flux of a potential gradient and humidity gradient balances the flux of an ion concentration gradient, the concentration distribution of the metal ion reaches steady state. When the potential gradient, ion concentration gradient, and humidity gradient in the electrolyte membrane are made clear, therefore, it is possible to estimate $C_g(z,t)$ and $C_s(z,t)$.

[Reference Literature 1] Kienits, B., et al. (2011). "Cationic Contamination Effects on Polymer Electrolyte Membrane Fuel Cell Performance," Journal of The Electrochemical Society 158(9) [Reference Literature 2] Shibata, M., et al. (2020). "A Theoretical and Experimental Study on Electrochemical Impedance Spectra of Polymer Electrolyte Membrane Fuel Cells for Cation Content Estimation," Journal of The Electrochemical Society 167(13)

Examples of the operation condition $\varphi(t)$ include:

(a) a current I(t), a voltage V(t), (b) a relative humidity $RH_{ca}(t)$ of a cathode gas, a relative humidity $RH_{an}(t)$ of an anode gas, (c) a pressure $P_{ca}(t)$ of the cathode gas, a pressure $P_{an}(t)$ of the anode gas, (d) a flow rate $Q_{ca}(t)$ of the cathode gas, and a flow rate $Q_{an}(t)$ of the anode gas.

Of these, the current I(t) and the voltage V(t) contribute to the formation of the potential gradient in the electrolyte membrane. On the other hand, the relative humidity RH(t), the pressure P(t), and the flow rate Q(t) each contribute to the formation of the humidity gradient in the electrolyte membrane. When $\varphi(t)$ is revealed, therefore, $C_g(z,t)$ and $C_s(z,t)$ can be estimated based on them.

A method of estimating $C_g(z,t)$ and $C_s(z,t)$ is not particularly limited and the most suitable method can be selected according to the purpose. Specific examples of such a method include the following ones.

2.1.1. Metal Ion Transport Equation

A first method is to estimate $C_g(z,t)$ and $C_s(z,t)$ by using a metal ion transport equation. The procedure A may include a procedure for performing such a method.

More specifically, "the method using a metal ion transport equation" is to couple an equation of a flux represented by the following equation (a) and a mass-charge conservation equation represented by the following equation (b) and thereby estimate a metal ion concentration in a divided volume. The $C_g(z,t)$ and $C_s(z,t)$ can be found by solving the equations (a) and (b).

[Math. 1]

$$\begin{pmatrix} J_{H+} \\ J_g \\ J_s \\ J_{H_2O} \end{pmatrix} = -\begin{pmatrix} L_{11} & L_{12} & L_{13} & L_{14} \\ L_{21} & L_{22} & L_{23} & L_{24} \\ L_{21} & L_{32} & L_{33} & L_{34} \\ L_{21} & L_{42} & L_{43} & L_{44} \end{pmatrix} \begin{pmatrix} \nabla\Phi_e \\ \nabla C_g \\ \nabla C_s \\ \nabla C_{H_2O} \end{pmatrix} \tag{a}$$

$$\begin{pmatrix} 0 \\ \frac{dC_g}{dt} \\ \frac{dC_s}{dt} \\ \frac{dC_{H_2O}}{dt} \end{pmatrix} = -\begin{pmatrix} \nabla(J_{H+} + Z_{cg}J_g + Z_{cs}J_s) \\ \nabla J_g \\ \nabla J_s \\ \nabla J_{H_2O} \end{pmatrix} \tag{b}$$

where

J represents a flux,

C represents a metal ion concentration,

Z represents a metal ion valence,

L represents a coefficient, $\varphi_e$ represents a potential, $\nabla\varphi_e$ represents a potential gradient, $\nabla C_g$ and $\nabla C_s$ represent a concentration gradient of the metal ion, respectively.

$\nabla C_{H2O}$ represents a concentration gradient of water.

In the equations (a) and (b), the subscript "$H^+$" means that it is a parameter relating to a proton, the subscript "g" means that it is a parameter relating to a radical generating ion, the subscript "s" means that it is a parameter relating to a radical scavenging ion, and the subscript "$H_2O$" means that it is a parameter relating to water.

2.1.2. Simple Solution Method

The second method is to estimate the $C_g(z,t)$ and $C_s(z,t)$ by a simple solution method. The procedure A may include a procedure for performing such a method.

The term "simple solution method" specifically means a procedure of estimating the $C_g(z,t)$ and $C_s(z,t)$ by using:

(a) a first map showing the relation between a reference operation condition $\varphi^{ref}(t)$ at a time t and a concentration $C_g^{ref}(z,t)$ of the radical generating ion and a concentration $C_s^{ref}(z,t)$ of the radical scavenging ion under a steady state (dC/dt=0) of the $\varphi_{ref}(t)$, and (b) a second map showing the relation between the reference operation condition $\varphi^{ref}(t)$ and a time constant $\tau$ of metal ion transport, each map being prepared in advance.

The procedure A may include a procedure for performing such a method.

It is to be noted that a "reference operation condition $\varphi^{ref}$" means an operation condition under which a load command requested can be realized and at the same time, the highest power generation efficiency can be attained.

The term "time constant $\tau$" is a time necessary for increasing a cation distribution $C(z,t+\tau)$, after retained for the period of a time $\tau$ under a certain condition $\varphi(t)$ with an initial cation distribution as C(z,t), by an amount corresponding to (1-1/e) time (about 63.2%, e is a base of natural logarithm) the difference between $C^{ref}(z,t)$ in the steady state under the aforesaid condition and C(z,t). In short, the "time constant $\tau$" is a value satisfying the following equation:

$$C(z,t+\tau)=C(z,t)+\{C^{ref}(z,t)-C(z,t)\}(1-1/e)$$

The concentration $C_g^{ref}(z,t)$ of the radical generating ion and the concentration $C_s^{ref}(z,t)$ of the radical scavenging ion when a reference operation condition $\varphi^{ref}(t)$ is set at a time t and it reaches a steady state (dC/dt=0) are found in advance. In addition, the relation between $\varphi^{ref}(t)$ and $C_g^{ref}(z,t)$ or $C_s^{ref}(z,t)$ is mapped into a first map and it is stored in a memory.

Similarly, the relation between $\varphi^{ref}(t)$ and time constant $\tau$ is found in advance. In addition, the relation between $\varphi^{ref}(t)$ and $\tau$ is mapped into a second map and it is stored in the memory.

In this case, as the reference operation condition $\varphi^{ref}(t)$ is determined, $C_g^{ref}(z,t)$, $C_s^{ref}(z,t)$, and $\tau$ are determined. In addition, $C_g(z,t-\Delta t)$ and $C_s(z,t-\Delta t)$ are already known. By substituting them into the equations (c) and (d), the ion distributions $C_g(z,t)$ and $C_s(z,t)$ at the time t can therefore be estimated.

[Math. 2]

$$C_g(z,t) = C_g(z,\ t-\Delta t) + \{C_g^{ref}(z,t) - C_g(z,t-\Delta t)\}\frac{\Delta t}{\tau} \tag{2}$$

$$C_s(z,t) = C_s(z,t-\Delta t) + \{C_s^{ref}(z,t) - C_s(z,f-\Delta f)\}\frac{\Delta T}{\tau} \tag{d}$$

2.2. Procedure B

Next, a load command $p(t+\Delta t)$ $\Delta t$ a time $(t+\Delta t)$ is acquired and it is stored in the memory (Procedure B).

A method of acquiring the load command $p(t+\Delta t)$ is not particularly limited and the most suitable method can be selected according to the purpose.

2.3. Procedure C

Next, a reference operation condition $\varphi^{ref}(t+\Delta t)$ under which the load command $p(t+\Delta t)$ can be realized is acquired and it is stored in the memory (Procedure C).

As described above, the term "reference operation condition $\varphi^{ref}(t+\Delta t)$" means an operation condition under which the load command $p(t+\Delta t)$ can be realized and at the same time, the highest power generation efficiency can be attained. As the specification of a fuel cell and load command $p(t+\Delta t)$ are determined, the reference operation condition $\varphi^{ref}(t+\Delta t)$ is determined uniquely. A data base showing these relations is stored in the memory in advance and when the load command $p(t+\Delta t)$ is acquired, the reference operation condition $\varphi^{ref}(t+\Delta t)$ is read out from the data base.

2.4. Procedure D and Procedure G

2.4.1 Procedure D

Next, whether or not a judgment index $f_1(C_g(z,t), C_s(z,t))$ including $C_g(z,t)$ and/or $C_s(z,t)$ exceeds a first threshold value $\varepsilon_1$ (or is $\varepsilon_1$ or more) is judged (Procedure D).

The term "judgment index $f_1(C_g(z,t), C_s(z,t))$" means an index for judging whether or not a region in which the concentration $C_g(z,t)$ of the radical generating ion is relatively excessive over the concentration $C_s(z,t)$ of the radical scavenging ion appears. The judgment index $f_1(C_g(z,t), C_s(z,t))$ is a function of $C_g(z,t)$ and/or $C_s(z,t)$ because of its nature.

The term "first threshold value $\varepsilon_1$" is a threshold value of the judgment index $f_1(C_g(z,t), C_s(z,t))$ for judging whether or not the reference operation condition $\varphi^{ref}(t+\Delta t)$ acquired in the Procedure C is performed as is.

When the judgment index $f_1(C_g(z,t), C_s(z,t))$ does not exceed the first threshold value $\varepsilon_1$ (or it is not $\varepsilon_1$ or more), there is a low possibility of deterioration of the electrolyte membrane proceeding even if the reference operation condition $\varphi^{ref}(t+\Delta t)$ acquired in the Procedure C is performed as is. In this case, the reference operation condition $\varphi^{ref}(t+\Delta t)$ is performed as is.

On the other hand, when the judgment index $f_1(C_g(z,t), C_s(z,t))$ exceeds the first threshold value $\varepsilon_1$ (or it is $\varepsilon_1$ or more), there is a high possibility of the deterioration in the electrolyte membrane proceeding. In this case, an operation condition different from the reference operation condition $\varphi^{ref}(t+\Delta t)$ is performed.

The judgment index $f_1(C_g(z,t), C_s(z,t))$ is not particularly limited in so far as it permits such judgment. One example of the judgment index $f_1(C_g(z,t), C_s(z,t))$ is shown in the following equations (1) to (3). In the present invention, any of the following equations (1) to (3) may be used as the judgment index $f_1(C_g(z,t), C_s(z,t))$.

[Math. 3]

$$f_1(C_g(z,t), C_s(z,t)) = \max\left\{\frac{C_g(z,t)}{C_s(z,t)}\right\} \tag{1}$$

$$f_1(C_g(z,t), C_s(z,t)) = \max\{C_g(z,t)\} \tag{2}$$

$$f_1(C_g(z,t), C_s(z,t)) = \max\{C_s(z,t)\} \tag{3}$$

The equations (1) to (3) show that (a) the maximum $C_g(z,t)/C_s(z,t)$ ratio in the membrane thickness direction, (b) the maximum $C_g(z,t)$ in the membrane thickness direction, or (c) the maximum $C_s(z,t)$ in the membrane thickness direction are used as the judgment index $f_1(C_g(z,t), C_s(z,t))$, respectively. Any of the equations (1) to (3) can be an index for judging the local concentration of the radical generating ion.

2.4.2. Procedure G

Assuming that the reference operation condition $\varphi^{ref}(t+\Delta t)$ has been selected, how much the deterioration of the electrolyte membrane proceeds should be predicted precisely not by judging with a metal ion concentration (current value) at a current time t but by judging with a metal ion concentration (predicted value) at a time $(t+\Delta t)$. In other words, it is preferred to use, as the judgment index, not $C_g(z,t)$ and/or $C_s(z,t)$ but $C_g(z,t+\Delta t)$ and/or $C_s(z,t+\Delta t)$. However, it is the common practice to set, as $\Delta t$, a time interval sufficiently shorter than the metal ion transfer rate so that the results are almost similar for both judgment indexes.

When the judgment is made using the metal ion concentration at the time $(t+\Delta t)$, it is preferred, after the Procedure C and before the Procedure D, to estimate the concentration distribution $C_g(z,t+\Delta t)$ of the radical generating ion and the concentration distribution $C_g(z,t+\Delta t)$ of the radical scavenging ion in the electrolyte membrane at the time $(t+\Delta t)$ assuming that $\varphi^{ref}(t+\Delta t)$ is performed at the time $(t+\Delta t)$ and store them in the memory (Procedure G). A method of estimating $C_g(z,t+\Delta t)$ and $C_s(z,t+\Delta t)$ is similar to that in the Procedure A so that a description on it will be omitted.

When the Procedure G is performed, the Procedure D preferably includes a procedure of judging whether or not a judgment index $f_1(C_g(z,t+\Delta t), C_s(z,t+\Delta t))$ instead of the judgment index $f_1(C_g(z,t), C_s(z,t))$ exceeds $\varepsilon_1$ (or is $\varepsilon_1$ or more).

In this case, the judgment index $f_1(C_g(z,t+\Delta t), C_s(z,t+\Delta t))$ is similar to the judgment index $f_1(C_g(z,t), C_s(z,t))$ except for the use of $C_g(z,t+\Delta t)$ and/or $C_s(z,t+\Delta t)$ instead of $C_g(z,t)$ and/or $C_s(z,t)$ so that a description on it will be omitted.

2.5. Procedure E

Next, when $f_1(C_g(z,t), C_s(z,t))$ is judged to exceed $\varepsilon_1$ (or judged to be $\varepsilon_1$ or more) or $f_1(C_g(z,t+\Delta t), C_s(z,t+\Delta t))$ is judged to exceed $\varepsilon_1$ (or judged to be $\varepsilon_1$ or more) in the Procedure D, an operation condition which is different from $\varphi^{ref}(t+\Delta t)$ and under which the $f_1(C_g(z,t), C_s(z,t))$ is $\varepsilon_1$ or less is selected as $\varphi(t+\Delta t)$ (Procedure E).

On the other hand, when $f_1(C_g(z,t), C_s(z,t))$ is judged not to exceed $\varepsilon_1$ (or judged not to be $\varepsilon_1$ or more) or $f_1(C_g(z,t+\Delta t), C_s(z,t+\Delta t))$ is judged not to exceed $\varepsilon_1$ (or judged not to be $\varepsilon_1$ or more) in the Procedure D, $\varphi^{ref}(t+\Delta t)$ is selected as $\varphi(t+\Delta t)$ (Procedure E).

This means that when it is judged that local concentration of the radical generating ion does not occur even if the reference operation condition $\varphi^{ref}(t+\Delta t)$ is performed as is, power is generated under the reference operation condition $\varphi^{ref}(t+\Delta t)$.

On the other hand, when it is judged that local concentration of the radical generating ion occurs if the reference operation condition $\varphi^{ref}(t+\Delta t)$ is performed as is, power is generated under an operation condition under which local concentration of the radical generating ion is suppressed. In this case, actual electricity of the fuel cell is sometimes excessive or insufficient relative to the load command p. In such a case, it is preferred to store the excessive electricity in a secondary battery or supply the insufficient electricity from the secondary battery.

The following are specific examples of a method of suppressing the local concentration of the radical generating ion. Any one of the following methods may be used, or two or more of them may be used in combination insofar as they can be physically combined.

2.5.1. Control of Current I(t): Procedures Elland $E_{12}$

The Procedure E may include:

(a) Procedure $E_{11}$ of setting a current $I(t+\Delta t)$ at the time $(t+\Delta t)$ to make an absolute value of a current reduction rate smaller than that in the case where $\varphi^{ref}(t+\Delta t)$ is assumed to be performed when a transfer rate of the radical scavenging ion is slower than a transfer rate of the radical generating ion, and/or (b) Procedure $E_{12}$ of setting the current $I(t+\Delta t)$ at the time $(t+\Delta t)$ to make an absolute value of a current increase rate smaller than that in the case where $\varphi^{ref}(t+\Delta t)$ is assumed to be performed when a transfer rate of the radical scavenging ion is faster than a transfer rate of the radical generating ion.

First, the case where a transfer rate of the radical scavenging ion is slower than a transfer rate of the radical generating ion is considered.

When a fuel cell is stopped, the radical scavenging ion and the radical generating ion are distributed uniformly in the electrolyte membrane. By starting power generation from this state (by increasing a current I(t)), a potential gradient occurs in the electrolyte membrane to transfer a metal ion to a cathode side. In this case, when the transfer rate of the radical scavenging ion is slower than the transfer rate of the radical generating ion, the radical generating ion reaches the cathode side earlier.

When the fuel cell reaches a steady state, on the other hand, the radical scavenging ion and the radical generating ion are both concentrated on the cathode side. A decrease in current I(t) from this state causes a reduction in potential gradient and a metal ion transfers to the anode side. In this case, when the transfer rate of the radical scavenging ion is slower than the transfer rate of the radical generating ion, the radical generating ion reaches the anode side earlier.

Usually, the concentration of the radical scavenging ion is set higher than the concentration of the radical generating ion. When the transfer rate of the radical scavenging ion is slower than the transfer rate of the radical generating ion and the current increases, there is a high possibility of at least a predetermined amount of the radical scavenging ion being present on the cathode side from the beginning. Even if a current increase rate is relatively fast, therefore, there is a low possibility of the radical generating ion being relatively concentrated on the cathode side.

On the other hand, when the current is decreased from the steady state, there is a high possibility of a reduction in the concentration of the radical scavenging ion on the anode side. When the current reduction rate is relatively fast, therefore, there is a high possibility of the radical generating ion being relatively concentrated on the anode side.

It is therefore preferred to control the current so that the absolute value of the current reduction rate be smaller than that under the reference operation condition when the transfer rate of the radical scavenging ion is slower than the transfer rate of the radical generating ion.

Next, the case where the transfer rate of the radical scavenging ion is faster than the transfer rate of the radical generating ion is considered.

When the transfer rate of the radical scavenging ion is faster than the transfer rate of the radical generating ion and the current increases, there is a high possibility of the radical scavenging ion reaching the cathode side earlier and the radical generating ion being left on the anode side.

It is therefore preferred to control the current so that the absolute value of the current increase rate be smaller than that under the reference operation condition when the transfer rate of the radical scavenging ion is faster than the transfer rate of the radical generating ion.

More specifically, the Procedures $E_{11}$ and $E_{12}$ each preferably include a procedure of setting $I(t+\Delta t)$ by using the following equation (4).

[Math. 4]

$$I(t+\Delta t) = I(t) + \frac{1}{a_1}\max\left(a_1\left(\frac{I^{ref}(t+\Delta t)-I(t)}{\Delta t}\right), -f_I(C_s(z,t), C_g(z,t))\right)\Delta t \tag{4}$$

where $f_I(C_s(z,t), C_g(z,t))$ is a minimum absolute value of a current change rate determined depending on the concentration of the radical scavenging ion or the concentration of the radical generating ion on a cathode-side surface or anode-side surface of an electrolyte membrane, $I^{ref}(t+\Delta t)$ is a reference current included in a reference operation condition $\varphi^{ref}(t+\Delta t)$, and $a^1$ is a control constant and is a positive real number in the Procedure $E_{11}$ and a negative real number in the Procedure $E_{12}$.

The $f_1(C_s(z,t), C_g(z,t))$ is not particularly limited and the most suitable value can be selected for it depending on the purpose. Preferred examples of the $f_I(C_s(z,t), C_g(z,t))$ include those represented by the following equation (4a) or (4b). The $f_I$ represented in the equations (4a) and (4b) is a function that always returns a positive value. The $f_I$ represents a function that returns a small value when the concentration $C_s(L,t)$ of the radical scavenging ion at the end portion (z=L) on the cathode side is larger than an average concentration $C_s^{ave}$ of the radical scavenging ion.

[Math. 5]

$$f_I(C_s(z,t), C_g(z,t)) = \frac{b_1}{(C_s(L,t)/C_s^{ave})^{c1}} \tag{4a}$$

$$f_I(C_s(z,t), C_g(z,t)) = \frac{b_1}{c1^{(C_s(L,t)/C_s^{ave})}} \tag{4b}$$

where $b_1$ is a control constant and is a positive value, $c_1$ is a control constant and $c_1>0$ in the equation (4a) and $c_1>1$ in the equation (4b), L is a thickness of the electrolyte membrane, and $C_s^{ave}$ is an average concentration of the radical scavenging ion.

2.5.2. Control of Voltage V(t): Procedures $E_{21}$ and $E_{22}$

The Procedure E may include:

(c) Procedure $E_{21}$ of setting a voltage $V(t+\Delta t)$ at the time $(t+\Delta t)$ to make an absolute value of a voltage reduction rate smaller than that in the case where $\varphi^{ref}(t+\Delta t)$ is assumed to be performed when a transfer rate of the radical scavenging ion is slower than a transfer rate of the radical generating ion, and/or (d) Procedure $E_{22}$ of setting the voltage $V(t+\Delta t)$ at the time $(t+\Delta t)$ to make an absolute value of a voltage increase rate smaller than that in the case where $\varphi^{ref}(t+\Delta t)$ is assumed to be performed when a transfer rate of the radical scavenging ion is faster than a transfer rate of the radical generating ion.

Voltage V(t), similar to Current I(t), has an influence on the potential gradient in the electrolyte membrane.

It is therefore preferred to control the voltage so that the absolute value of the voltage reduction rate be smaller than that under the reference operation condition when the transfer rate of the radical scavenging ion is slower than the transfer rate of the radical generating ion.

On the contrary, it is preferred to control the voltage so that the absolute value of the voltage increase rate be smaller than that under the reference operation condition when the transfer rate of the radical scavenging ion is faster than the transfer rate of the radical generating ion.

More specifically, the Procedures $E_{21}$ and $E_{22}$ each preferably include a procedure of setting $V(t+\Delta t)$ by using the following equation (5).

[Math. 6]

$$V(t+\Delta t) = V(t) + \frac{1}{2_1}\max\left(a_2\left(\frac{V^{ref}(t+\Delta t) - V(t)}{\Delta t}\right), -f_V(C_s(z,t), C_g(z,t))\right)\Delta t \tag{5}$$

where $f_v(C_s(z,t), C_g(z,t))$ is a minimum absolute value of a voltage change rate determined depending on the concentration of the radical scavenging ion or the concentration of the radical generating ion on a cathode-side surface or anode-side surface of the electrolyte membrane, $V^{ref}(t+\Delta t)$ is a reference voltage included in a reference operation condition $\varphi^{ref}(t+\Delta t)$, and $a_2$ is a control constant and is a negative real number in the Procedure $E_{21}$ and a positive real number in the Procedure $E_{22}$.

The $f_V(C_s(z,t), C_g(z,t))$ is not particularly limited and the most suitable value can be selected for it depending on the purpose. Preferred examples of the $f_V(Cs(z,t), C_g(z,t))$ include those represented by the following equation (5a) or (5b). The $f_V$ represented in the equations (5a) and (5b) is a function that always returns a positive value. The $f_V$ represents a function that returns a small value when the concentration $C_s(L,t)$ of the radical scavenging ion at the end portion on the cathode side is larger than an average concentration $C_s^{ave}$ of the radical scavenging ion.

[Math. 7]

$$f_V(C_s(z,t), C_g(z,t)) = \frac{b_2}{(C_s(L,t)/C_s^{ave})^{c2}} \tag{5a}$$

$$f_V(C_s(z,t), C_g(z,t)) = \frac{b_1}{{}_{c2}(C_s(L,t)/C_s^{ave})} \tag{5b}$$

where $b_2$ is a control constant and is a real number from 0 to 1, $c_2$ is a control constant and is a real number from 0 to 1 in the equation (5a) and $c_2>1$ in the equation (5b), L is a thickness of the electrolyte membrane, and $C_s^{ave}$ is an average concentration of the radical scavenging ion.

2.5.3. Control of Relative Humidity $RH_{ca}(t)$ of Cathode Gas: Procedures $E_{31}$ and $E_{32}$ The Procedure E may include:

(a) Procedure $E_{31}$ of setting a relative humidity $RH_{ca}(t+\Delta t)$ of a cathode gas at the time $(t+\Delta t)$ to be higher than that under $\varphi^{ref}(t+\Delta t)$ when a concentration of the radical scavenging ion or the radical generating ion on a cathode side is higher than that on an anode side, and/or (b) Procedure $E_{32}$ of setting the relative humidity $RH_{ca}(t+\Delta t)$ of the cathode gas at the time $(t+\Delta t)$ to be lower than that under $\varphi^{ref}(t+\Delta t)$ when the concentration of the radical scavenging ion or the radical generating ion on the anode side is higher than that on the cathode side.

First, the case where the concentration of the radical scavenging ion or radical generating ion on the cathode side is higher than that on the anode side is considered. The case where the humidity on the cathode side is larger than that on the anode side is defined as "positive humidity gradient".

As described above, when the potential gradient in the electrolyte membrane changes, the radical scavenging ion or radical generating ion is sometimes concentrated on the cathode side. In such a case, increasing the relative humidity $RH_{ca}(t)$ of a cathode gas leads to an increase in the positive humidity gradient. As a result, diffusion of a metal ion from the cathode side to the anode side is accelerated.

When the metal ion is concentrated on the cathode side, therefore, the humidity is preferably controlled to make the relative humidity of the cathode gas higher than that of the reference operation condition.

Next, the case where the concentration of the radical scavenging ion or radical generating ion on the anode side is higher than that on the cathode side is considered.

As described above, when the potential gradient in the electrolyte membrane changes, the radical scavenging ion or radical generating ion is sometimes concentrated on the anode side. In such a case, reducing the relative humidity $RH_{ca}(t)$ of a cathode gas leads to a decrease in the positive humidity gradient. As a result, diffusion of a metal ion from the anode side to the cathode side is accelerated.

When the metal ion is concentrated on the anode side, therefore, the humidity is preferably controlled to make the relative humidity of the cathode gas lower than that of the reference operation condition.

More specifically, the Procedures $E_{31}$ and $E_{32}$ each preferably include a procedure of setting $RH_{ca}(t+\Delta t)$ by using the following equation (6).

[Math. 8]

$$RH_{ca}(t+\Delta t) = RH_{ca}^{ref}(t+\Delta t) + f_{RH}^{ca}(C_s(z,t), C_g(z,t)) \quad (6)$$

where $f_{RH}^{ca}(C_s(z,t), C_g(z,t))$ is a change margin of a cathode-side humidity determined depending on the concentration of the radical scavenging ion or the concentration of the radical generating ion on a cathode-side surface or anode-side surface of the electrolyte membrane, and $RH_{ca}^{ref}(t+\Delta t)$ is a reference relative humidity of the cathode gas included in the reference operation condition $\varphi^{ref}(t+\Delta t)$.

The $f_{RH}^{ca}(C_s(z,t), C_g(z,t))$ is not particularly limited and the most suitable value can be selected for it depending on the purpose. The $f_{RH}^{ca}(C_s(z,t), C_g(z,t))$ is preferably represented, for example, by the following equation (6a). The $f_{RH}^{ca}$ represented by the equation (6a) is 0 when $C_s(L,t)/C_s^{ave}$ is a value between (1-$b_3$) and (1+$c_3$) and when it is a value outside this range, it represents a function that monotonically increases depending on the value of $C_s(L,t)/C_s^{ave}$.

[Math. 9]

$$f_{RH}^{ca}(C_s(z,t), C_g(z,t)) = a_3 \times \min\left(\frac{C_s(L,t)}{C_s^{ave}} - 1 + b_3, \max\left(\frac{C_s(L,t)}{C_s^{ave}} - 1 - c_3, 0\right)\right)^{d3} \quad (6a)$$

where $a_3$ is a control constant and is a positive real number, $b_3$ and $c_3$ are each a control constant and is a real number from 0 to 1, $d_3$ is a control constant and is an odd number, $C_s(L,t)$ is a concentration of the radical scavenging ion on the cathode side, $C_g(L,t)$ is a concentration of the radical generating ion on the cathode side, and $C_a^{ave}$ is an average concentration of the radical scavenging ion.

2.5.4. Control of Relative Humidity $RH_{an}(t)$ of Anode Gas: Procedure $E_{41}$ and $E_{42}$ The Procedure E may include:

(c) Procedure $E_{41}$ of setting a relative humidity $RH_{an}$(t+Δt) of an anode gas at a time(t+Δt) to be lower than that under $\varphi^{ref}(t+\Delta t)$ when the concentration of the radical scavenging ion or radical generating ion on the cathode side is higher than that on the anode side, and/or (d) Procedure $E_{42}$ of setting the relative humidity $RH_{an}$ (t+Δt) of the anode gas at a time (t+Δt) to be higher than that under $\varphi^{ref}(t+\Delta t)$ when the concentration of the radical scavenging ion or radical generating ion on the anode side is higher than that on the cathode side.

Similar to the relative humidity $RH_{ca}(t)$ of the cathode gas, the relative humidity $RH_{an}(t)$ of the anode gas has an influence on the humidity gradient in the electrolyte membrane.

When a metal ion is concentrated on the cathode side, therefore, the humidity is preferably controlled to make the relative humidity of the anode gas lower than that under the reference operation condition.

On the contrary, when a metal ion is concentrated on the anode side, the humidity is preferably controlled to make the relative humidity of the anode gas higher than that under the reference operation condition.

More specifically, the Procedures $E_{41}$ and $E_{42}$ each preferably include a procedure of setting $RH_{an}(t+\Delta t)$ by using the following equation (7).

[Math. 10]

$$RH_{an}(t+\Delta t) = RH_{an}^{ref}(t+\Delta t) + f_{RH}^{an}(C_s(z,t), C_g(z,t)) \quad (7)$$

where $f_{RH}^{an}(C_s(z,t), C_g(z,t))$ is a change margin of an anode-side humidity determined depending on the concentration of the radical scavenging ion or the concentration of the radical generating ion on a cathode-side surface or anode-side surface of the electrolyte membrane, and $RH_{an}^{ref}(t+\Delta t)$ is a reference relative humidity of the anode gas included in the reference operation condition $\varphi_{ref}(t+\Delta t)$.

The $f_{RH}^{an}(C_s(z,t), C_g(z,t))$ is not particularly limited and the most suitable value can be selected for it depending on the purpose. The $f_{RH}^{an}(Cs(z,t), C_g(z,t))$ is preferably represented, for example, by the following equation (7a). The $f_{RH}^{an}$ represented by the equation (7a) is 0 when $C_s(L,t)/C_s^{ave}$ is a value between (1-$b_4$) and (1+$c_4$) and when it is a value outside this range, it represents a function that monotonically decreases depending on the value of $C_s(L,t)/C_s^{ave}$.

[Math. 11]

$$f_{RH}^{an}(C_s(z,t), C_g(z,t)) = a_4 \times \min\left(\frac{C_s(L,t)}{C_s^{ave}} - 1 + b_4, \max\left(\frac{C_s(L,t)}{C_s^{ave}} - 1 - c_4, 0\right)\right)^{d4} \quad (7a)$$

where $a_4$ is a control constant and is a negative real number, $b_4$ and $c_4$ are each a control constant and is a real number from 0 to 1, $d_4$ is a control constant and is an odd number, $C_s(L,t)$ is a concentration of the radical scavenging ion on the cathode side, $C_g(L,t)$ is a concentration of the radical generating ion on the cathode side, and $C_s^{ave}$ is an average concentration of the radical scavenging ion.

2.5.5. Control of Pressure $P_{ca}(t)$ of Cathode Gas: Procedures $E_{51}$ and $E_{52}$ The Procedure E may include:

(a) Procedure $E_{51}$ of setting a pressure $P_{ca}(t+\Delta t)$ of a cathode gas at the time (t+Δt) to be higher than that under the $\varphi^{ref}(t+\Delta t)$ when a concentration of the radical scavenging ion or the radical generating ion on a cathode side is higher than that on an anode side, and/or (b) Procedure $E_{52}$ of setting the pressure $P_{ca}(t+\Delta t)$ of the cathode gas at the time (t+Δt) to be lower than that under the $\varphi^{ref}(t+\Delta t)$ when a concentration of the radical scavenging ion or the radical generating ion on the anode side is higher than that on the cathode side.

Similar to the relative humidity $RH_{ca}(t)$ of the cathode gas, the pressure $P_{ca}(t)$ of the cathode gas has an influence on the humidity gradient in the electrolyte membrane. In general, with an increase in $P_{ca}(t)$, water becomes unlikely to volatilize from the cathode-side surface of the electrolyte membrane, leading to an increase in the positive humidity gradient.

When a metal ion is concentrated on the cathode side, therefore, a pressure is preferably controlled to make the pressure of the cathode gas higher than that under the reference operation condition.

On the contrary, when a metal ion is concentrated on the anode side, a pressure is preferably controlled to make the pressure of the cathode gas lower than that under the reference operation condition.

More specifically, the Procedures $E_{51}$ and $E_{52}$ each preferably include a procedure of setting $P_{ca}(t+\Delta t)$ by using the following equation (8).

[Math. 12]

$$P_{ca}(t+\Delta t) = P_{ca}^{ref}(t+\Delta t) + f_P^{ca}(C_s(z,t), C_g(z,t)) \tag{8}$$

where $f_p^{ca}(C_s(z,t), C_g(z,t))$ is a change margin of the pressure of the cathode gas determined depending on the concentration of the radical scavenging ion or the concentration of the radical generating ion on a cathode-side surface or anode-side surface of the electrolyte membrane, and $P_{ca}^{ref}(t+\Delta t)$ is a reference pressure of the cathode gas included in the reference operation condition $\varphi^{ref}(t+\Delta t)$.

The $f_p^{ca}(C_s(z,t), C_g(z,t))$ is not particularly limited and the most suitable value can be selected for it depending on the purpose. The $f_p^{ca}(C_s(z,t), C_g(z,t))$ is preferably represented, for example, by the following equation (8a). The $f_p^{ca}$ represented by the equation (8a) is 0 when $C_s(L,t)/C_s^{ave}$ is a value between $(1-b_5)$ and $(1+c_5)$ and when it is a value outside this range, it represents a function that monotonically increases depending on the value of $C_s(L,t)/C_s^{ave}$.

[Math. 13]

$$f_P^{an}(C_s(z,t), C_g(z,t)) = a_5 \times \min\left(\frac{C_s(L,t)}{C_s^{ave}} - 1 + b_5, \max\left(\frac{C_s(L,t)}{C_s^{ave}} - 1 - c_5, 0\right)\right)^{d5} \tag{8a}$$

where $a_5$ is a control constant and is a positive real number, $b_5$ and $c_5$ are each a control constant and is a real number from 0 to 1, $d_5$ is a control constant and is an odd number, $C_s(L,t)$ is a concentration of the radical scavenging ion on the cathode side, $C_g(L,t)$ is a concentration of the radical generating ion on the cathode side, and $C_s^{ave}$ is an average concentration of the radical scavenging ion.

2.5.6. Control of Pressure $P_{an}(t)$ of Anode Gas: Procedures $E_{61}$ and $E_{62}$ The Procedure E may include:

(c) Procedure $E_{61}$ of setting a pressure $P_{an}(t+\Delta t)$ of an anode gas at the time $(t+\Delta t)$ to be lower than that under the $\varphi^{ref}(t+\Delta t)$ when a concentration of the radical scavenging ion or the radical generating ion on a cathode side is higher than that on an anode side, and/or (d) Procedure $E_{62}$ of setting the pressure $P_{an}(t+\Delta t)$ of the anode gas at the time $(t+\Delta t)$ to be higher than that under the $\varphi_{ref}(t+\Delta t)$ when a concentration of the radical scavenging ion or the radical generating ion on the anode side is higher than that on the cathode side.

Similar to the pressure $P_{ca}(t)$ of the cathode gas, the pressure $P_{an}(t)$ of the anode gas has an influence on the humidity gradient in the electrolyte membrane. In general, with an increase in $P_{an}(t)$ water becomes unlikely to volatilize from the anode-side surface of the electrolyte membrane, leading to a decrease in the positive humidity gradient.

When a metal ion is concentrated on the cathode side, therefore, a pressure is preferably controlled to make the pressure of the anode gas lower than that under the reference operation condition.

On the contrary, when a metal ion is concentrated on the anode side, a pressure is preferably controlled to make the pressure of the anode gas higher than that under the reference operation condition.

More specifically, the Procedures $E_{61}$ and $E_{62}$ each preferably include a procedure of setting $P_{an}(t+\Delta t)$ by using the following equation (9).

[Math. 14]

$$P_{an}(t+\Delta t) = P_{an}^{ref}(t+\Delta t) + f_P^{an}(C_s(z,t), C_g(z,t)) \tag{9}$$

where $f_p^{an}(C_s(z,t), C_g(z,t))$ is a change margin of the pressure of the anode gas determined depending on the concentration of the radical scavenging ion or the concentration of the radical generating ion on a cathode-side surface or anode-side surface of the electrolyte membrane, and the $P_{an}^{ref}(t+\Delta t)$ is a reference pressure of the anode gas included in the reference operation condition $\varphi^{ref}(t+\Delta t)$.

The $f_p^{an}(C_s(z,t), C_g(z,t))$ is not particularly limited and the most suitable value can be selected for it depending on the purpose. The $f_p^{an}(C_s(z,t), C_g(z,t))$ is preferably represented, for example, by the following equation (9a). The $f_p^{an}$ represented by the equation (9a) is 0 when $C_s(L,t)/C_s^{ave}$ is a value between $(1-b_6)$ and $(1+c_6)$ and when it is a value outside this range, it represents a function that monotonically decreases depending on the value of $C_s(L,t)/C_s^{ave}$.

[Math. 15]

$$f_P^{an}(C_s(z,t), C_g(z,t)) = a_6 \times \min\left(\frac{C_s(L,t)}{C_s^{ave}} - 1 + b_6, \max\left(\frac{C_s(L,t)}{C_s^{ave}} - 1 - c_1, 0\right)\right)^{d6} \tag{9a}$$

where $a_6$ is a control constant and is a negative real number, $b_6$ and $c_6$ are each a control constant and is a real number from 0 to 1, $d_6$ is a control constant and is an odd number, $C_s(L,t)$ is a concentration of the radical scavenging ion on the cathode side, $C_g(L,t)$ is a concentration of the radical generating ion on the cathode side, and $C_s^{ave}$ is an average concentration of the radical scavenging ion.

2.5.7. Control of Flow Rate $Q_{ca}(t)$ of Cathode Gas: Procedures $E_{71}$ and $E_{72}$ The Procedure E may include:

(a) Procedure $E_{71}$ of setting a flow rate $Q_{ca}(t+\Delta t)$ of a cathode gas at the time $(t+\Delta t)$ to be smaller than that under the $\varphi_{ref}(t+\Delta t)$ when a concentration of the radical scavenging ion or the radical generating ion on a cathode side is higher than that on an anode side, and/or (b) Procedure $E_{72}$ of setting the flow rate $Q_{ca}(t+\Delta t)$ of the cathode gas at the time $(t+\Delta t)$ to be larger than that under the $\varphi^{ref}(t+\Delta t)$ when a concentration of the radical scavenging ion or the radical generating ion on the anode side is higher than that on the cathode side.

Similar to the relative humidity $RH_{ca}(t)$ of the cathode gas, the flow rate $Q_{ca}(t)$ of the cathode gas has an influence on the humidity gradient in the electrolyte membrane. In general, with a decrease in $Q_{ca}(t)$, water becomes unlikely to volatilize from the cathode-side surface of the electrolyte membrane, leading to an increase in the positive humidity gradient.

When a metal ion is concentrated on the cathode side, therefore, a flow rate is preferably controlled to make the flow rate of the cathode gas smaller than that under the reference operation condition.

On the contrary, when a metal ion is concentrated on the anode side, a flow rate is preferably controlled to make the flow rate of the cathode gas larger than that under the reference operation condition.

More specifically, the Procedures $E_{71}$ and $E_{72}$ each preferably include a procedure of setting $Q_{ca}(t+\Delta t)$ by using the following equation (10).

[Math. 16]

$$Q_{ca}(t+\Delta t) = Q_{ca}^{ref}(r+\Delta t) + f_Q^{ca}(C_s(z,t), C_g(z,t)) \tag{10}$$

where $f_Q^{ca}(C_s(z,t), C_g(z,t))$ is a change margin of the flow rate of the cathode gas determined depending on the concentration of the radical scavenging ion or the concentration of the radical generating ion on a cathode-side surface or anode-side surface of the electrolyte membrane, and $Q_{ca}^{ref}(t+\Delta t)$ is a reference flow rate of the cathode gas included in the reference operation condition $\varphi(t+\Delta t)$.

The $f_Q^{ca}(C_s(z,t), C_g(z,t))$ is not particularly limited and the most suitable value can be selected for it depending on the purpose. The $f_Q^{ca}(Cs(z,t), C_g(z,t))$ is preferably represented, for example, by the following equation (10a). The $f_Q^{ca}$ represented by the equation (10a) is 0 when $C_s(L,t)/C_s^{ave}$ is a value between $(1-b_7)$ and $(1+c_7)$ and when it is a value outside this range, it represents a function that monotonically decreases depending on the value of $C_s(L,t)/C_s^{ave}$.

[Math. 17]

$$f_Q^{an}(C_s(z,t), C_g(z,t)) = a_7 \times \min\left(\frac{C_s(L,t)}{C_s^{ave}} - 1 + b_7, \max\left(\frac{C_s(L,t)}{C_s^{ave}} - 1 - c_7, 0\right)\right)^{d7} \tag{10a}$$

where $a_7$ is a control constant and is a negative real number, $b_7$ and $c_7$ are each a control constant, $d_7$ is a control constant and is an odd number, $C_s(L,t)$ is a concentration of the radical scavenging ion on the cathode side, $C_g(L,t)$ is a concentration of the radical generating ion on the cathode side, and $C_s^{ave}$ is an average concentration of the radical scavenging ion.

2.5.8. Control of Flow Rate $Q_{an}(t+\Delta t)$ of Anode Gas: Procedure $E_{81}$ and $E_{82}$ The Procedure E may include:

(c) Procedure $E_{81}$ of setting a flow rate $Q_{an}(t+\Delta t)$ of an anode gas at the time $(t+\Delta t)$ to be larger than that under the $\varphi^{ref}(t+\Delta t)$ when a concentration of the radical scavenging ion or the radical generating ion on a cathode side is higher than that on an anode side, and/or (d) Procedure $E_{82}$ of setting the flow rate $Q_{an}(t+\Delta t)$ of the anode gas at the time $(t+\Delta t)$ to be smaller than that under the $\varphi^{ref}(t+\Delta t)$ when a concentration of the radical scavenging ion or the radical generating ion on the anode side is higher than that on the cathode side.

Similar to the flow rate $Q_{ca}(t)$ of the cathode gas, the flow rate $Q_{an}(t)$ of the anode gas has an influence on the humidity gradient in the electrolyte membrane. In general, with an increase in $Q_{an}(t)$, water is more likely to volatilize from the anode-side surface of the electrolyte membrane, leading to an increase in the positive humidity gradient.

When a metal ion is concentrated on the cathode side, therefore, a flow rate is preferably controlled to make the flow rate of the anode gas larger than that under the reference operation condition.

On the contrary, when a metal ion is concentrated on the anode side, a flow rate is preferably controlled to make the flow rate of the anode gas smaller than that under the reference operation condition.

More specifically, the Procedures $E_{81}$ and $E_{82}$ each preferably include a procedure of setting $Q_{an}(t+\Delta t)$ by using the following equation (11).

[Math. 18]

$$Q_{an}(t+\Delta t) = Q_{an}^{ref}(t+\Delta t) + f_Q^{an}(C_s(z,t), C_g(z,t)) \tag{11}$$

where $f_Q^{an}(C_s(z,t), C_g(z,t))$ is a change margin of the flow rate of the anode gas determined depending on the concentration of the radical scavenging ion or the concentration of the radical generating ion on a cathode-side surface or anode-side surface of the electrolyte membrane, and $Q_{an}^{ref}(t+\Delta t)$ is a reference flow rate of the anode gas included in the reference operation condition $\varphi^{ref}(t+\Delta t)$.

The $f_Q^{an}(C_s(z,t), C_g(z,t))$ is not particularly limited and the most suitable value can be selected for it depending on the purpose. The $f_Q^{an}(C_s(z,t), C_g(z,t))$ is preferably represented, for example, by the following equation (11a). The $f_Q^{an}$ represented by the equation (11a) is 0 when $C_s(L,t)/C_s^{ave}$ is a value between $(1-b_8)$ and $(1+c_8)$ and when it is a value outside this range, it represents a function that monotonically increases depending on the value of $C_s(L,t)/C_s^{ave}$.

[Math. 19]

$$f_Q^{an}(C_s(z,t), C_g(z,t)) = a_8 \times \min\left(\frac{C_s(L,t)}{C_s^{ave}} - 1 + b_8, \max\left(\frac{C_s(L,t)}{C_s^{ave}} - 1 - c_8, 0\right)\right)^{d8} \tag{11a}$$

where

- $a_8$ is a control constant and is a positive real number,
- $b_8$ and $c_8$ are each a control constant,
- $d_8$ is a control constant and is an odd number,
- $C_s(L,t)$ is a concentration of the radical scavenging ion on the cathode side,
- $C_g(L,t)$ is a concentration of the radical generating ion on the cathode side, and
- $C_s^{ave}$ is an average concentration of the radical scavenging ion.

2.6. Flow Chart

FIG. 1 shows a flow chart of the fuel cell control program according to the present invention. First, in Step 1 (hereinafter simply referred to as "S1"), substitute an initial value "0" for the time t.

Next, in S2, set an initial operation condition φ(0). A method of setting φ(0) is not particularly limited. For example, φ(0) can be set for such a condition as "flowing a minute amount of a supply gas after setting a humidity of the gas at 0% RH and an outlet pressure at atmospheric pressure while keeping a current at 0".

Next, in S3, based on an operation condition φ(t) at the time t of a polymer electrolyte fuel cell containing a radical generating ion and a radical scavenging ion in the electrolyte thereof, estimate a concentration distribution $C_g(z,t)$ of the radical generating ion and a concentration distribution $C_s(z, t)$ of the radical scavenging ion in the electrolyte membrane (z is a position in the membrane thickness direction of the electrolyte membrane) and store them in a memory (Procedure A). A method of estimating the Cg(z,t) and Cs(z,t) has already been described above in detail so that a description on them is omitted.

Next, in S4, acquire a load command p(t+Δt) at a time (t+Δt) and stored it in the memory (Procedure B).

Next, in S5, acquire a reference operation condition $\varphi^{ref}$(t+Δt) under which the load command p(t+Δt) can be realized and store it in the memory (Procedure C).

Next, in S6, estimate a concentration distribution $C_g(z,t+\Delta t)$ of the radical generating ion and a concentration distribution $C_s(z,t+\Delta t)$ of the radical scavenging ion in the electrolyte membrane at the time (t+Δt) assuming that the $\varphi^{ref}$(t+Δt) is performed at the time (t+Δt) and store them in the memory (Procedure G). As described above, the Δt is relatively short so that S6 may be omitted.

Next, in S7, judge whether or not a judgment index $f_1(C_g(z,t+\Delta t), C_s(z,t+\Delta t))$ including $C_g(z,t+\Delta t)$ and/or $C_s(z, t+\Delta t)$ exceeds a first threshold value $\varepsilon_1$ (or is $\varepsilon_1$ or more) (Procedure D). When S6 is omitted, judge in S7 whether or not a judgment index $f_1(C_g(z,t), C_s(z,t))$ including $C_g(z,t)$ and/or $C_s(z,t)$ exceeds a first threshold value $\varepsilon_1$ (or is $\varepsilon_1$ or more).

When $f_1>\varepsilon_1$ (or $f_1\geq\varepsilon_1$) holds (S7: YES), the electrolyte membrane may deteriorate if the $\varphi^{ref}$(t+Δt) is performed as is. In such a case, proceed to S8 and select an operation condition $f_2$ which is different from the $\varphi^{ref}$(t+Δt) and under which the $f_1(C_g(z,t+\Delta t), C_s(z,t+\Delta t))$ is $\varepsilon_1$ or less (or is less than $\varepsilon_1$) (Procedure E). The operation condition $f_2$ usually depends on the φ(t), $\varphi^{ref}$(t+Δt), $C_g(z,t+\Delta t)$, and $C_g(z,t+\Delta t)$.

Next, proceed to S9. In S9, judge whether or not the operation is terminated. When the operation is not terminated (S9: NO), proceed to S10. In S10, add Δt to the time t. Then, return to S3. Then, repeat the above-described steps S3 to S10 until the operation is terminated (S9: YES).

When $f_1>\varepsilon_1$ (or $f_1\geq\varepsilon_1$) does not hold (S7: NO), the electrolyte membrane is not likely to deteriorate even if the $\varphi^{ref}$(t+Δt) is performed as is. In such a case, proceed to S11. In S11, select $\varphi^{ref}$(t+Δt) as φ(t+Δt) (Procedure E).

Next, proceed to S9. Then, repeat the above-described steps S3 to S11 until the operation is terminated (S9: YES).

3. Fuel Cell System

The fuel cell system according to the present invention includes:

- a polymer electrolyte fuel cell,
- a secondary battery for storing surplus electricity generated by the polymer electrolyte fuel cell, and
- a control device for controlling an operation of the polymer electrolyte fuel cell and the secondary battery,
- wherein the control device has a fuel cell control program according to the present invention housed therein.

3.1. Polymer Electrolyte Fuel Cell

In the present invention, the structure of the polymer electrolyte fuel cell is not particularly limited and the most suitable structure can be selected for it depending on the purpose.

3.2. Secondary Battery

A secondary battery is for storing surplus power generated using the polymer electrolyte fuel cell. In the present invention, as described above, in order to suppress deterioration of an electrolyte membrane, the polymer electrolyte fuel cell does not always generate power equivalent to the load command p. Therefore, the power generated using the polymer electrolyte fuel cell may have an excess or deficiency relative to the load command p. In the present invention, the secondary battery is used not only for simply storing surplus power but also for eliminating the excess or deficiency of power relative to the load command p.

3.3. Control Device

A control device is for controlling the operation conditions of the polymer electrolyte fuel cell and secondary battery. The fuel cell system usually has, in addition to a fuel cell,

- (a) a fuel gas supply device for supplying a fuel (anode gas) to an anode,
- (b) an oxidizing agent gas supply device for supplying an oxidizing agent (cathode gas) to a cathode,
- (c) a humidifier for humidifying the anode gas and/or the cathode gas,
- (d) a cooling device for cooling the fuel cell, and
- (e) a condenser for separating a liquid from an anode-side and/or cathode-side discharged gas, and the like.

The control device is for controlling the operation of these devices.

In the present invention, the control device has the control program according to the present invention housed therein. The fuel cell system according to the present invention is different from the conventional one in the above-described point. The details of the fuel cell control program are as described above so that a description on them will be omitted.

4. Effect

Some metal ions (for example, Fe ion) are known to have an effect of forming a radical in a fuel cell. Intrusion of such an ion (radical generating ion) in an electrolyte membrane as an impurity may be a cause of the deterioration in the electrolyte membrane.

On the other hand, some metal ions (for example, Ce ion) are known to have an effect of scavenging a radical in the fuel cell. Addition of such an ion (radical scavenging ion) to the electrolyte membrane in advance may suppress the deterioration of the electrolyte membrane even if the radical generation ion intrudes in the electrolyte membrane.

The radical generating ion and the radical scavenging ion are both distributed uniformly in the electrolyte membrane when the fuel cell is stopped, but when the fuel cell is activated, they transfer to a cathode side or an anode side due to a potential gradient, ion concentration gradient, humidity gradient, or the like. In addition, the transfer rate of the radical generating ion is usually different from the transfer rate of the radical scavenging ion. During a phase of a current increase from a stopped state or a phase of a current decrease from a steady state, transfer of either one of them is delayed and there temporarily appears a region in which the concentration of the radical generating ion becomes relatively excessive compared with the concentration of the radical scavenging ion. As a result, in the region where the radical generation ion is concentrated, the electrolyte membrane may deteriorate.

The fuel cell control program according to the present invention, on the other hand, (a) successively estimates a concentration distribution $C_g(z,t)$ of a radical generating ion and a concentration distribution $C_s(z,t)$ of a radical scavenging ion in an electrolyte membrane at a time t (Procedure A), (b) judges whether or not a locally concentrated region of the radical generating ion is formed (in other words, judges whether or not the judgment index $f_1(C_g(z,t), C_s(z,t))$ exceeds a first threshold value $\varepsilon_1$) when an operation condition is changed (in other words, when a load demand $p(t+\Delta t)$ at a time $(t+\Delta t)$ is acquired) and the changed operation condition is performed as is (Procedures B to D), and (c) selects an operation condition different from a reference operation condition $\varphi^{ref}(t+\Delta t)$ which is to be determined based on the load command $p(t+\Delta t)$ (in other words, selects an operation condition capable of mitigating the local concentration of the radical generating ion), when it is judged that there is a high possibility of a region in which the radical generating ion is locally concentrated being formed (Procedure E).

Even if there is a change in the potential gradient, ion concentration gradient, humidity gradient, or the like which may occur in the electrolyte membrane during the operation of the fuel cell, therefore, it is possible to suppress the deterioration of the electrolyte membrane caused by the temporary formation of a region in which the radical generating ion is concentrated.

EXAMPLE

Example 1, Comparative Example 1

1. Test Method

A simulation was performed to obtain a change in an ion concentration ratio (=concentration of the radical generating ion/concentration of the radical scavenging ion) at the time when a fuel cell containing, in an electrolyte membrane thereof, a predetermined amount of the radical generating ion and the radical scavenging ion was started. For the simulation, the model equation described in Reference Literature 2 was used.

The changes in ion concentration ratio were determined respectively:

in the case (a) where a fuel cell was controlled using the control program according to the present invention (Example 1), and in the case (b) where a fuel cell was controlled so as to obtain an output as ordered by the load command (Comparative Example 1).

In addition, the transfer rate of the radical generating ion (for example, Fe ion) was assumed to be faster than that of the radical scavenging ion (for example, Ce ion).

2. Result

Figure 2A:
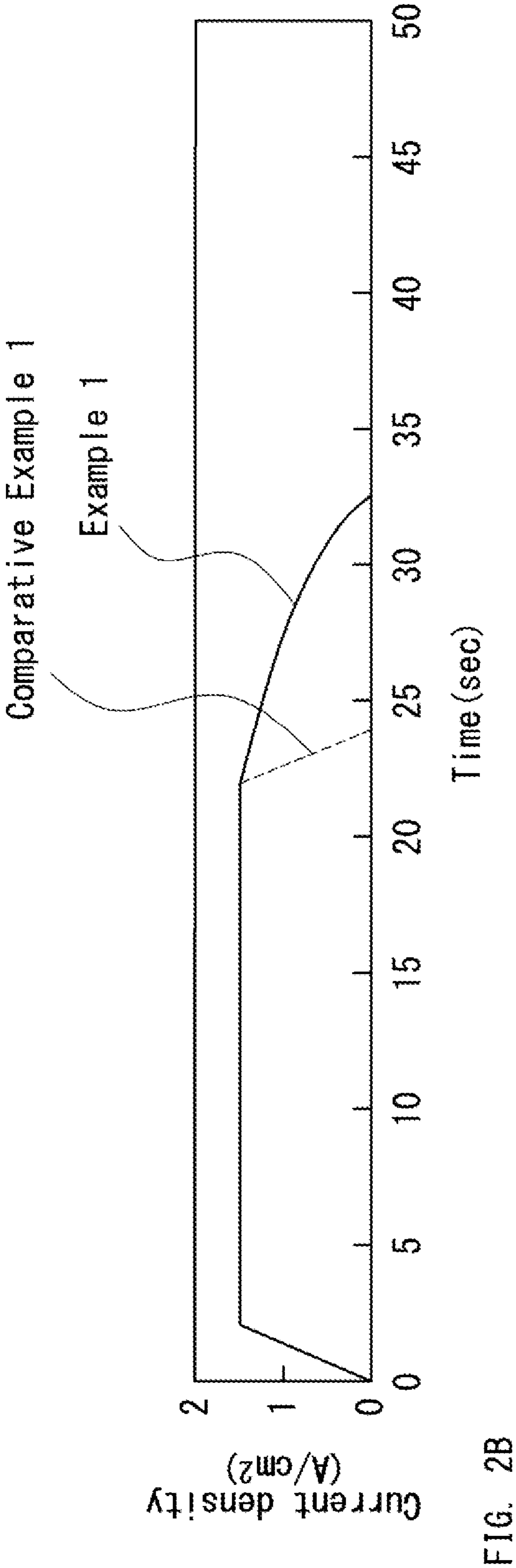
FIG. 2A is a diagram illustrating a time-dependent change of a current density.
Figure 2B:
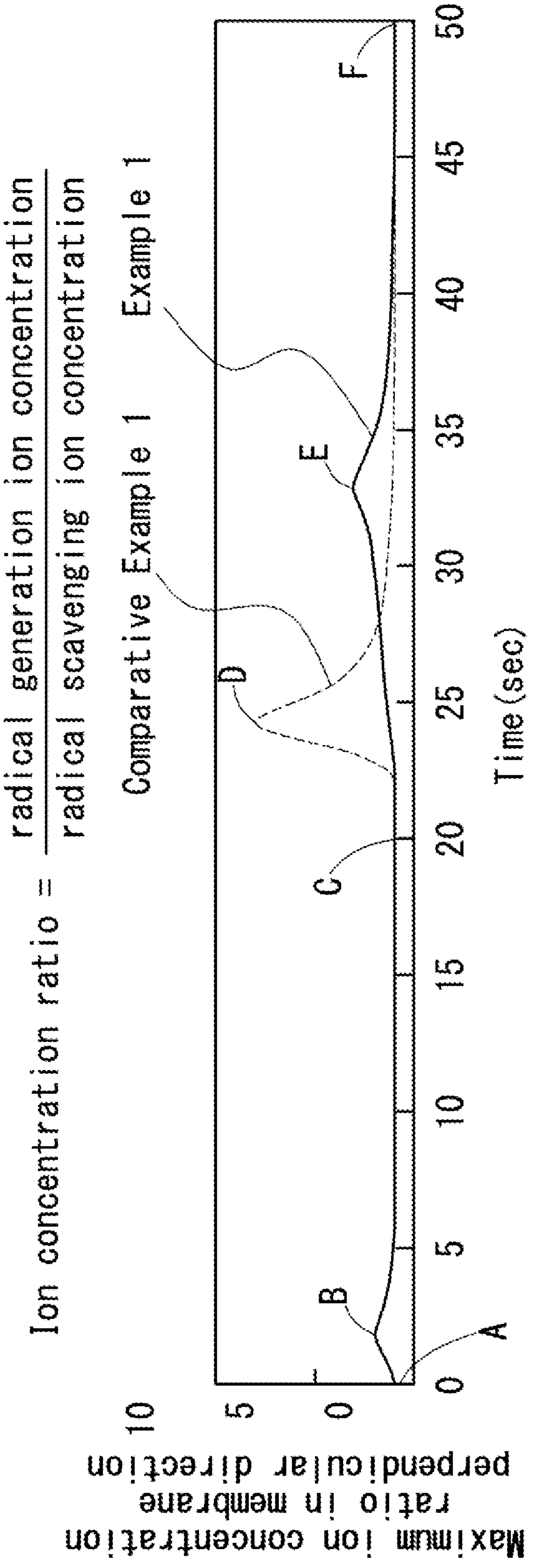
FIG. 2B is a diagram illustrating a time-dependent change of a maximum ion concentration ratio in a membrane perpendicular direction.

FIG. 2(A) shows a time-dependent change of a current density. FIG. 2(B) shows a time-dependent change of the maximum ion concentration ratio in the membrane perpendicular direction. FIGS. 3 to 8 respectively show the relation between a membrane-thickness-direction relative position and a metal ion concentration relative ratio or an ion concentration ratio at Points A to F in FIG. 2(B).

It is to be noted that the term "metal ion concentration relative ratio" means a ratio of anionic groups occupied by each metal ion among the anionic groups in the electrolyte membrane. Assuming that the concentration of the anionic group is $C_{anion}$, the valence number of the anionic group is $Z_{anion}$, the concentration of the metal ion is $C_{cation}$, and the valence number of the metal ion is $Z_{cation}$, the following equation holds: metal ion concentration relative ratio$=Z_{cation}\cdot C_{cation}/(Z_{anion}\cdot C_{anion})$.

The following can be understood from FIGS. 2 to 8.

Figure 3:
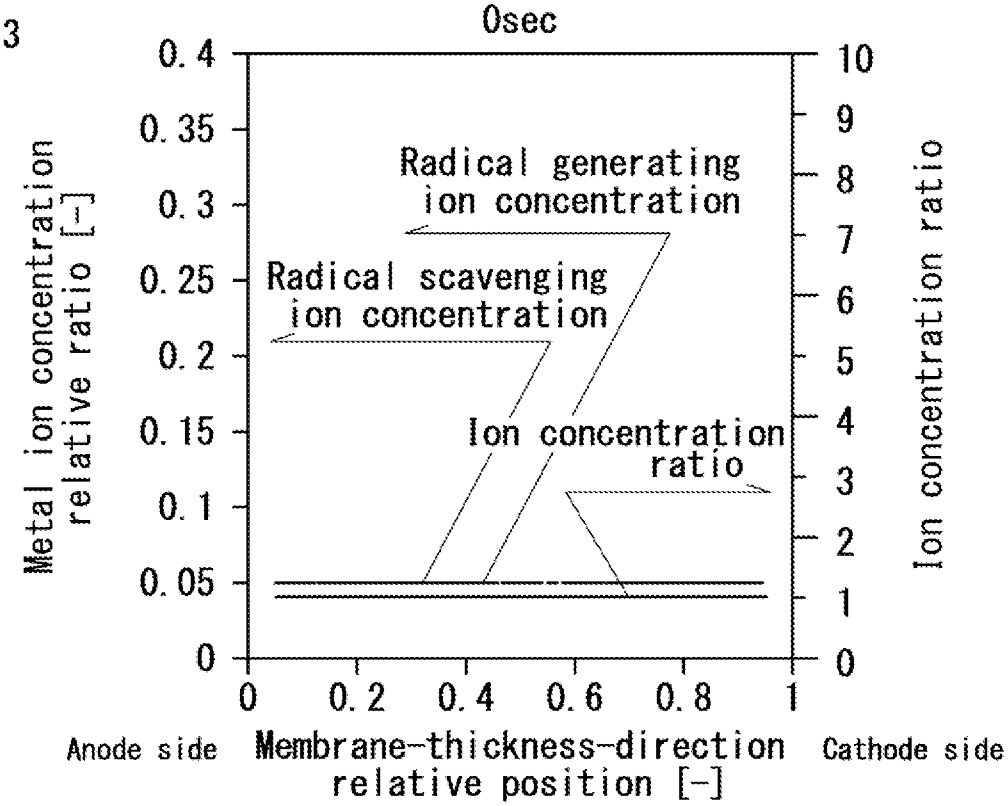
FIG. 3 is a diagram illustrating the relation between a membrane-thickness-direction relative position and a metal ion concentration relative ratio or ion concentration ratio at Point A of FIG. 2B.
Figure 4:
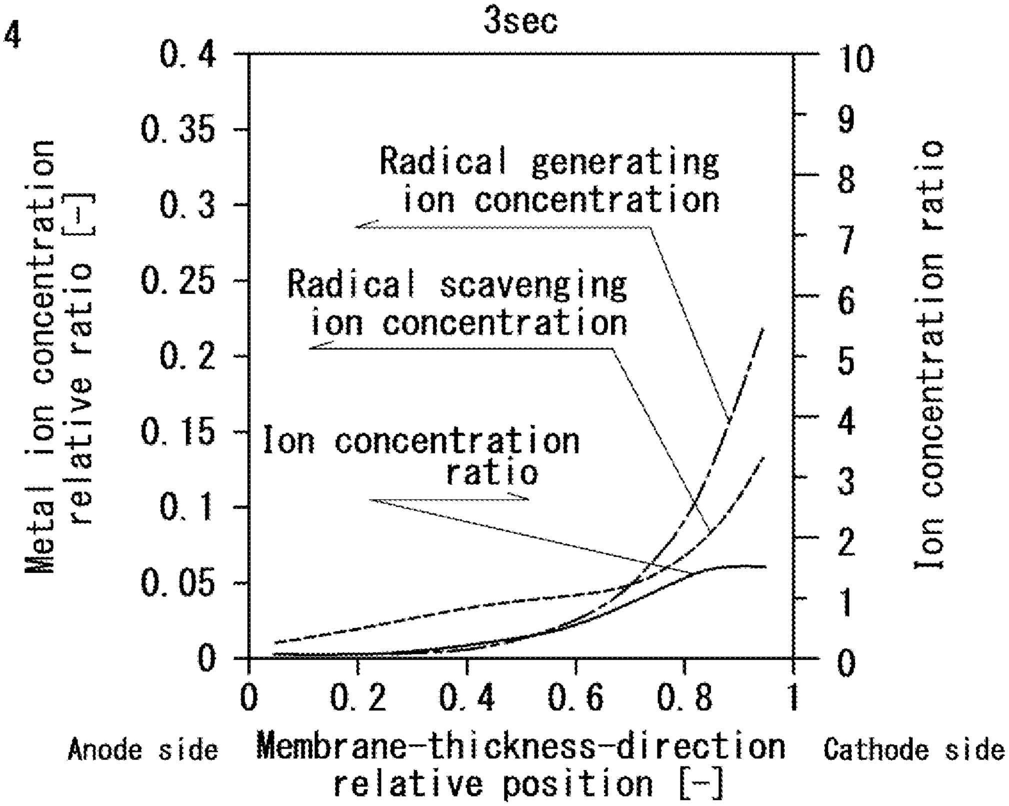
FIG. 4 is a diagram illustrating the relation between a membrane-thickness-direction relative position and a metal ion concentration relative ratio or ion concentration ratio at Point B of FIG. 2B.

(1) At the time t=0, the radical generating ion and the radical scavenging ion were distributed uniformly in the electrolyte membrane (FIG. 3). Increasing a current density from the aforesaid state increased the ion concentration ratio at point B in FIG. 2(B). This is because due to a fast transfer rate of the radical generating ion, there appears a region where the ion concentration ratio becomes large on the cathode side (FIG. 4).

Figure 5:
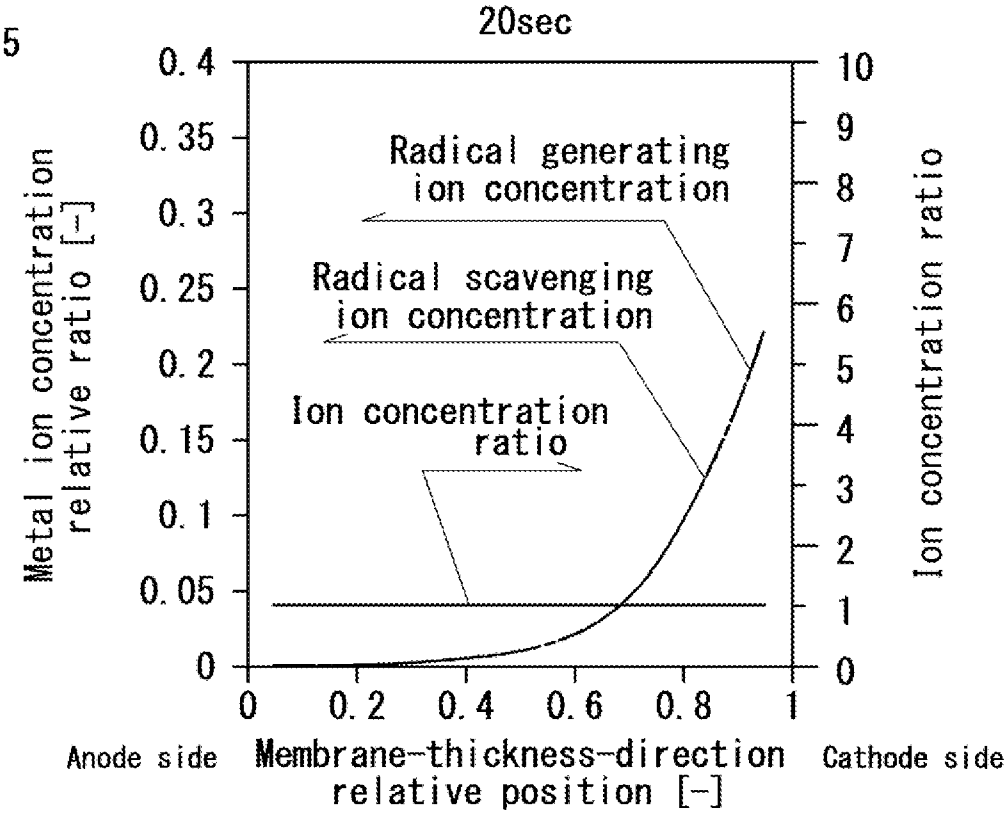
FIG. 5 is a diagram illustrating the relation between a membrane-thickness-direction relative position and a metal ion concentration relative ratio or ion concentration ratio at Point C of FIG. 2B.

(2) After starting, when power generation was continued while keeping the current density constant, the ion concentration ratio showed a constant value. This is because a flux by a metal-ion concentration gradient and a flux by a potential gradient are balanced and the segregation of the metal ion reached a steady state (FIG. 5).

Figure 6:
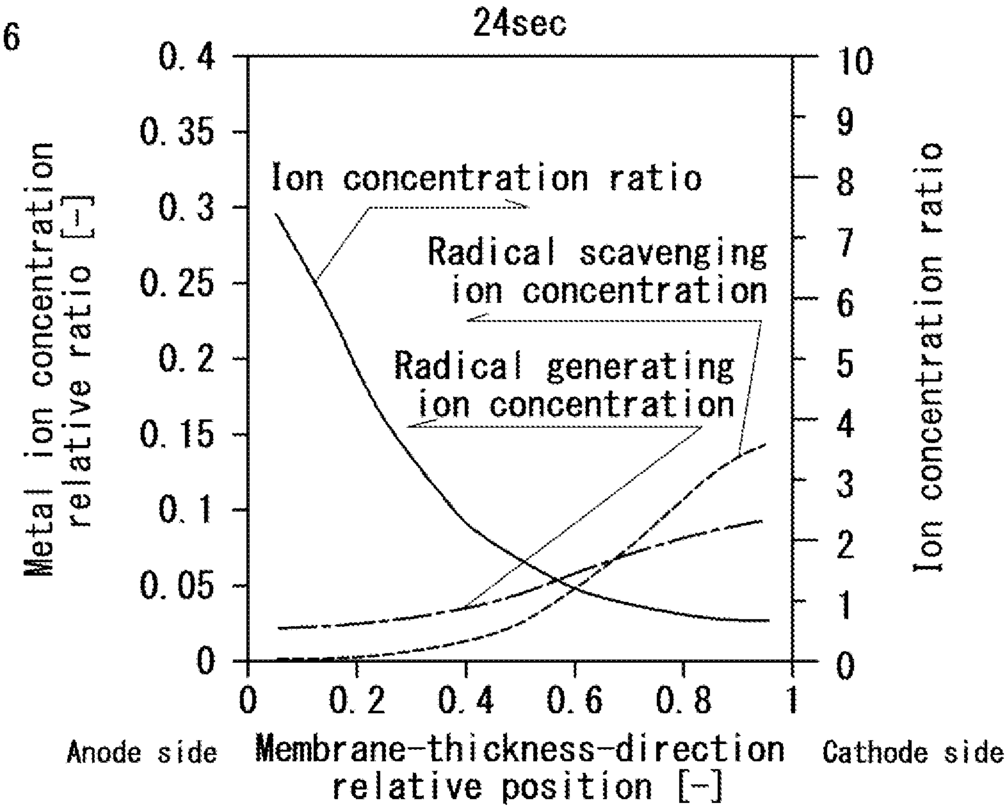
FIG. 6 is a diagram illustrating the relation between a membrane-thickness-direction relative position and a metal ion concentration relative ratio or ion concentration ratio at Point D of FIG. 2B.

(3) About 22 seconds after starting, a current density was rapidly decreased. In that case, in Comparative Example 1, the ion concentration ratio at point D rapidly increased. As the current density was decreased rapidly, the metal ion tried to return to a uniform state. The time constant of the transport of the radical scavenging ion was larger than the time constant of the radical generating ion, which retarded the uniformization of the radical scavenging ion. As a result, it is presumed that a region where the ion concentration ratio showed a large increase appeared on the anode side (FIG. 6).

Figure 7:
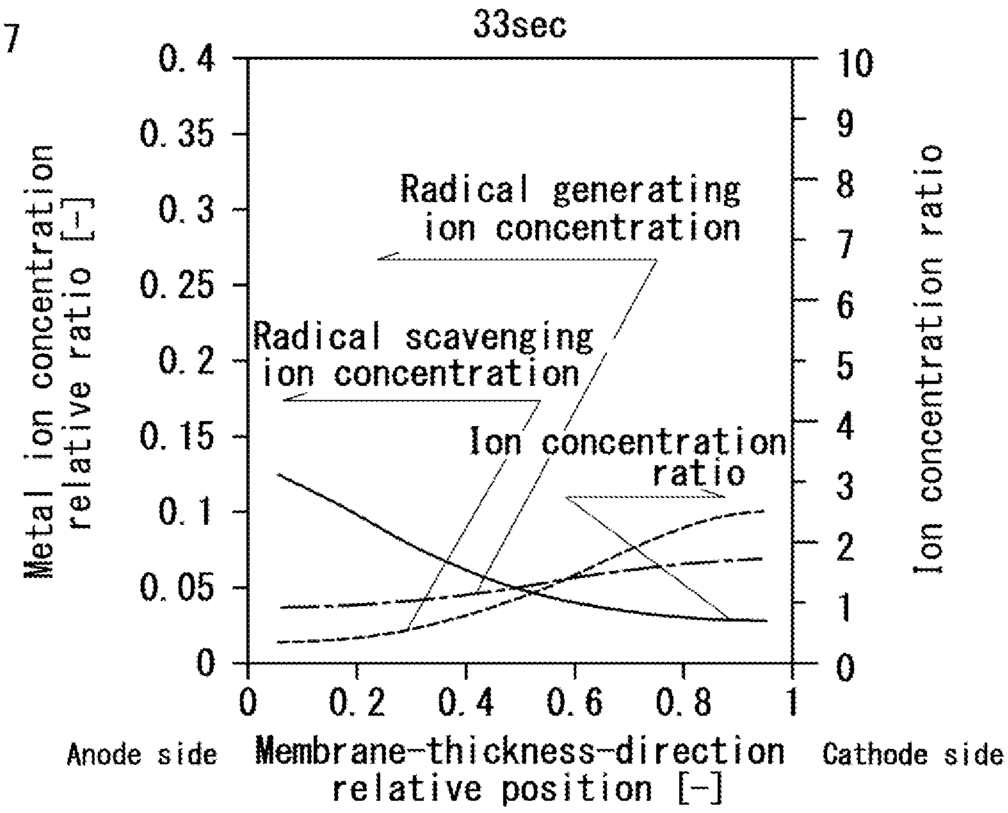
FIG. 7 is a diagram illustrating the relation between a membrane-thickness-direction relative position and a metal ion concentration relative ratio or ion concentration ratio at Point E of FIG. 2B.

(4) On the other hand, in Example 1, an absolute value of a reduction rate of a current density was made smaller than that in Comparative Example 1. The ion concentration ratio therefore became maximum at Point E, but its magnitude was smaller by far than that at Point D (FIG. 7).

Figure 8:
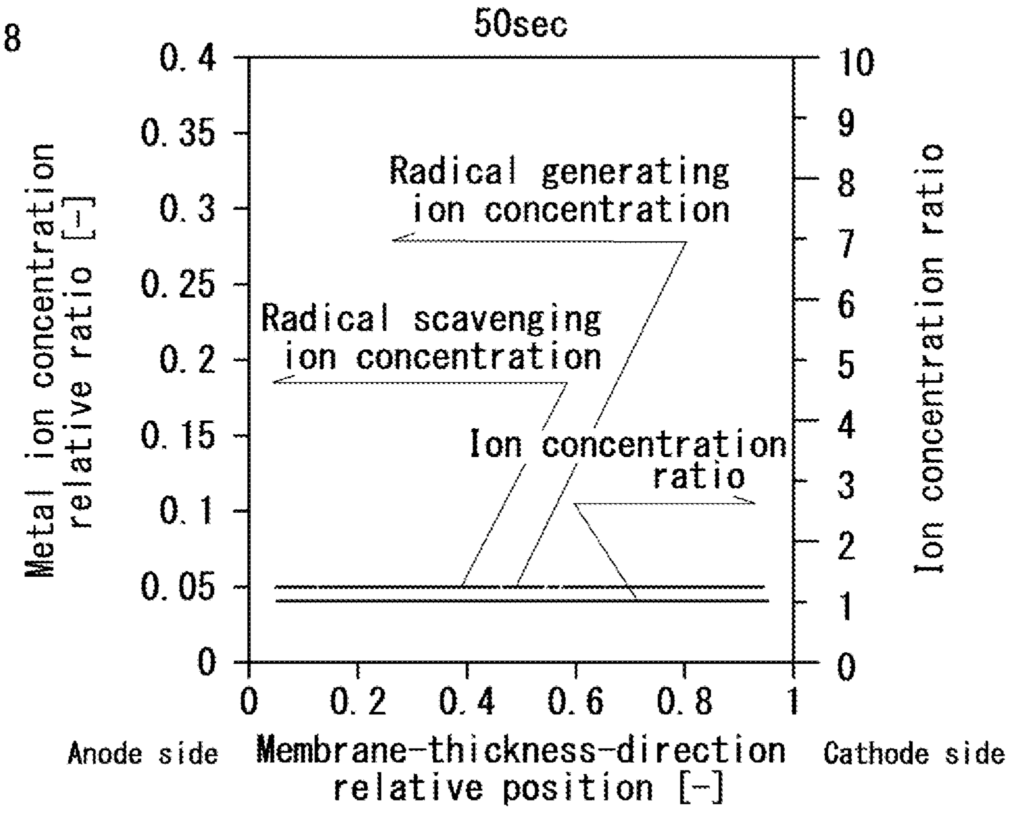
FIG. 8 is a diagram illustrating the relation between a membrane-thickness-direction relative position and a metal ion concentration relative ratio or ion concentration ratio at Point F of FIG. 2B.

(5) When kept at a low current thereafter, the ion concentration ratio gradually decreased. At Point F, the metal ion concentration became uniform again (FIG. 8).

Thus, the embodiment of the present invention was described in detail. The present invention is however not limited by the aforesaid embodiment and can be modified in various ways without departing from the gist of the present invention.

INDUSTRIAL APPLICABILITY

The fuel cell control program according to the present invention can be used for the control of the operation condition of a polymer electrolyte fuel cell to be used as a vehicle power source.

The invention claimed is:

1. A fuel cell control program for having a computer perform the following procedures:

(A) Procedure A of estimating, based on an operation condition φ(t) at a time t of a polymer electrolyte fuel cell containing, in an electrolyte membrane thereof, a radical generating ion and a radical scavenging ion, a concentration distribution $C_g$(z,t) of the radical generating ion and a concentration distribution $C_s$(z,t) of the radical scavenging ion (wherein z means a membrane-thickness direction position in the electrolyte membrane) in the electrolyte membrane and storing the concentration distributions in a memory, (B) Procedure B of acquiring a load command p(t+Δt) at a time (t+Δt) and storing the load command in the memory, (C) Procedure C of acquiring a reference operation condition $φ^{ref}$(t+Δt) under which the load command p(t+Δt) can be realized and storing the reference operation condition in the memory, (D) Procedure D of judging whether or not a judgment index $f_1$($C_g$(z,t), $C_s$(z,t)) including the $C_g$(z,t) and/or the $C_s$(z,t) exceeds a first threshold value $ε_1$ (or is $ε_1$ or more), and (E) Procedure E of selecting, as the φ(t+Δt), an operation condition which is different from the $φ^{ref}$(t+Δt) and under which the $f_1$($C_g$(z,t), $C_s$(z,t)) is not more than the $ε_1$ (or is less than the $ε_1$) when the $f_1$($C_g$(z,t), $C_s$(z,t)) is judged to exceed the $ε_1$ (or is judged to be the $ε_1$ or more) in the Procedure D and selecting, as the φ(t+Δt), the $φ^{ref}$(t+Δt) when the $f_1$($C_g$(z, t), $C_s$(z,t)) is judged not to exceed the $ε_1$ (or is judged not to be the $ε_1$ or more) in the Procedure D.

2. The fuel cell control program according to claim 1, wherein the $f_1$($C_g$(z,t), $C_s$(z,t)) is represented by any of the following equations (1) to (3).

[Math. 1]

$$f_1(C_g(z,t), C_s(z,t)) = \max\left\{\frac{C_g(z,t)}{C_s(z,t)}\right\} \tag{1}$$

$$f_1(C_g(z,t), C_s(z,t)) = \max\{C_g(z,t)\} \tag{2}$$

$$f_1(C_g(z,t), C_s(z,t)) = \max\{C_s(z,t)\}. \tag{3}$$

3. The fuel cell control program according to claim 1, further comprising, after the Procedure C and before the Procedure D, Procedure G of estimating a concentration distribution $C_g$(z,t+Δt) of the radical generating ion and a concentration distribution $C_s$(z,t+Δt) of the radial scavenging ion in the electrolyte membrane at the time (t+Δt) assuming that the $φ^{ref}$(t+Δt) is performed at the time (t+Δt) and storing the concentration distributions in the memory, wherein the Procedure D includes a procedure of judging whether or not a judgment index $f_1$($C_g$(z,t+Δt), $C_s$(z,t+Δt)) instead of the judgment index $f_1$($C_g$(z,t), $C_s$(z,t)) exceeds the $ε_1$ (or is the $ε_1$ or more).

4. The fuel cell control program according to claim 1, wherein the Procedure E comprises:

(a) Procedure $E_{11}$ of setting a current I(t+Δt) at a time (t+Δt) to make an absolute value of a current reduction rate smaller than that in the case where the $φ^{ref}$(t+Δt) is assumed to be performed when a transfer rate of the radical scavenging ion is slower than a transfer rate of the radical generating ion, (b) Procedure $E_{12}$ of setting the current I(t+Δt) at the time (t+Δt) to make an absolute value of a current increase rate smaller than that in the case where the $φ^{ref}$(t+Δt) is assumed to be performed when a transfer rate of the radical scavenging ion is faster than a transfer rate of the radical generating ion, (c) Procedure $E_{21}$ of setting a voltage V (t+Δt) at the time (t+Δt) to make an absolute value of a voltage reduction rate smaller than that in the case where the $φ^{ref}$(t+Δt) is assumed to be performed when a transfer rate of the radical scavenging ion is slower than a transfer rate of the radical generating ion, and/or (d) Procedure $E_{22}$ of setting the voltage V (t+Δt) at the time (t+Δt) to make an absolute value of a voltage increase rate smaller than that in the case where the $φ^{ref}$(t+Δt) is assumed to performed when a transfer rate of the radical scavenging ion is faster than a transfer rate of the radical generating ion.

5. The fuel cell control program according to claim 4, wherein the Procedures $E_{11}$ and $E_{12}$ each comprise a procedure of setting the I(t+Δt) by using the following equation (4):

[Math. 2]

$$I(t+\Delta t) = I(t) + \frac{1}{a_1}\max\left(a_1\left(\frac{I^{ref}(t+\Delta t) - I(t)}{\Delta t}\right), -f_I(C_s(z,t), C_g(z,t))\right)\Delta t \tag{4}$$

wherein, $f_I$($C_s$(z,t), $C_g$(z,t)) is a minimum absolute value of a current change rate determined depending on a concentration of the radical scavenging ion or a concentration of the radical generating ion on a cathode-side surface or anode-side surface of the electrolyte membrane, $I^{ref}(t+\Delta t)$ is a reference current included in the reference operation condition $\varphi^{ref}(t+\Delta t)$, and $a_1$ is a control constant which is a positive real number in the Procedure $E_{11}$ and is a negative real number in the Procedure $E_{12}$.

6. The fuel cell control program according to claim 4, wherein the Procedures $E_{21}$ and $E_{22}$ each comprise a procedure of setting the $V(t+\Delta t)$ by using the following equation (5):

[Math. 3]

$$V(t+\Delta t) = V(t) + \frac{1}{a_2}\max\left(a_2\left(\frac{V^{ref}(t+\Delta t) - V(t)}{\Delta t}\right), -f_V(C_s(z,t), C_g(z,t))\right)\Delta t \quad (5)$$

wherein, $f_v(C_s(z,t), C_g(z,t))$ is a minimum absolute value of a voltage change rate determined depending on a concentration of the radical scavenging ion or a concentration of the radical generating ion on a cathode-side surface or anode-side surface of the electrolyte membrane, $V^{ref}(t+\Delta t)$ is a reference voltage included in the reference operation condition $\varphi^{ref}(t+\Delta t)$, and $a_2$ is a control constant and is a negative real number in the Procedure $E_{21}$ and a positive real number in the Procedure $E_{22}$.

7. The fuel cell control program according to claim 1, wherein the Procedure E comprises:

(a) Procedure $E_{31}$ of setting a relative humidity $RH_{ca}(t+\Delta t)$ of a cathode gas at the time $(t+\Delta t)$ to be higher than that under the $\varphi^{ref}(t+\Delta t)$ when a concentration of the radical scavenging ion or radical generating ion on a cathode side is higher than that on an anode side, (b) Procedure $E_{32}$ of setting the relative humidity $RH_{ca}(t+\Delta t)$ of the cathode gas at the time $(t+\Delta t)$ to be lower than that under the $\varphi^{ref}(t+\Delta t)$ when a concentration of the radical scavenging ion or radical generating ion on the anode side is higher than that on the cathode side, (c) Procedure $E_{41}$ of setting a relative humidity $RH_{an}(t+\Delta t)$ of an anode gas at the time $(t+\Delta t)$ to be lower than that under the $\varphi^{ref}(t+\Delta t)$ when the concentration of the radical scavenging ion or the radical generating ion on the cathode side is higher than that on the anode side, and/or (d) Procedure $E_{42}$ of setting the relative humidity $RH_{an}(t+\Delta t)$ of the anode gas at the time $(t+\Delta t)$ to be higher than that under the $\varphi^{ref}(t+\Delta t)$ when the concentration of the radical scavenging ion or the radical generating ion on the anode side is higher than that on the cathode side.

8. The fuel cell control program according to claim 7, wherein the Procedures $E_{31}$ and $E_{32}$ each comprise a procedure of setting the $RH_{ca}(t+\Delta t)$ by using the following equation (6):

[Math. 4]

$$RH_{ca}(t+\Delta t) = RH_{ca}^{ref}(t+\Delta t) + f_{RH}^{ca}(C_s(z,t), C_g(z,t)) \quad (6)$$

wherein, the $f_{PH}^{ca}(C_s(z,t), C_g(z,t))$ is a change margin of a cathode-side humidity determined depending on a concentration of the radical scavenging ion or a concentration of the radical generating ion on a cathode-side surface or anode-side surface of the electrolyte membrane, and the $RH_{ca}^{ref}(t+\Delta t)$ is a reference relative humidity of the cathode gas included in the reference operation condition $\varphi^{ref}(t+\Delta t)$.

9. The fuel cell control program according to claim 7, wherein the Procedures $E_{41}$ and $E_{42}$ each comprise a procedure of setting the $RH_{an}(t+\Delta t)$ by using the following equation (7):

[Math. 5]

$$RH_{an}(t+\Delta t) = RH_{an}^{ref}(t+\Delta t) + f_{RH}^{an}(C_s(z,t), C_g(z,t)) \quad (7)$$

wherein, the $f_{RH}^{an}(C_s(z,t), C_g(z,t))$ is a change margin of an anode-side humidity determined depending on a concentration of the radical scavenging ion or a concentration of the radical generating ion on a cathode-side surface or anode-side surface of the electrolyte membrane, and the $RH_{an}^{ref}(t+\Delta t)$ is a reference relative humidity of the anode gas contained in the reference operation condition $\varphi^{ref}(t+\Delta t)$.

10. The fuel cell control program according to claim 1, wherein the Procedure E comprises:

(a) Procedure $E_{51}$ of setting a pressure $P_{ca}(t+\Delta t)$ of a cathode gas at the time $(t+\Delta t)$ to be higher than that under the $\varphi^{ref}(t+\Delta t)$ when a concentration of the radical scavenging ion or the radical generating ion on a cathode side is higher than that on an anode side, (b) Procedure $E_{52}$ of setting the pressure $P_{ca}(t+\Delta t)$ of the cathode gas at the time $(t+\Delta t)$ to be lower than that under the $\varphi^{ref}(t+\Delta t)$ when a concentration of the radical scavenging ion or the radical generating ion on the anode side is higher than that on the cathode side, (c) Procedure $E_{61}$ of setting a pressure $P_{an}(t+\Delta t)$ of an anode gas at the time $(t+\Delta t)$ to be lower than that under the $\varphi^{ref}(t+\Delta t)$ when the concentration of the radical scavenging ion or the radical generating ion on the cathode side is higher than that on the anode side, and/or (d) Procedure $E_{62}$ of setting the pressure $P_{an}(t+\Delta t)$ of the anode gas at the time $(t+\Delta t)$ to be higher than that under the $\varphi^{ref}(t+\Delta t)$ when the concentration of the radical scavenging ion or the radical generating ion on the anode side is higher than that on the cathode side.

11. The fuel cell control program according to claim 10, wherein the Procedures $E_{51}$ and $E_{52}$ each comprise a procedure of setting the $P_{ca}(t+\Delta t)$ by using the following equation (8):

[Math. 6]

$$P_{ca}(t+\Delta t) = P_{ca}^{ref}(t+\Delta t) + f_P^{ca}(C_s(z,t), C_g(z,t)) \quad (8)$$

wherein, the $f_p^{ca}(C_s(z,t), C_g(z,t))$ is a change margin of the pressure of the cathode gas determined depending on a concentration of the radical scavenging ion or a concentration of the radical generating ion on a cathode-side surface or anode-side surface of the electrolyte membrane, and the $P_{ca}^{ref}(t+\Delta t)$ is a reference pressure of the cathode gas included in the reference operation condition $\varphi^{ref}(t+\Delta t)$.

12. The fuel cell control program according to claim 10, wherein the Procedures $E_{61}$ and $E_{62}$ each comprise a procedure of setting the $P_{an}(t+\Delta t)$ by using the following equation (9):

[Math. 7]

$$P_{an}(t+\Delta t) = P_{an}^{ref}(t+\Delta t) + f_P^{an}(C_s(z,t), C_g(z,t)) \quad (9)$$

wherein, the $f_p^{an}(C_s(z,t), C_g(z,t))$ is a change margin of the pressure of the anode gas determined depending on a concentration of the radical scavenging ion or a concentration of the radical generating ion on a cathode-side surface or anode-side surface of the electrolyte membrane, and the $P_{an}^{ref}(t+\Delta t)$ is a reference pressure of the anode gas included in the reference operation condition $\varphi^{ref}(t+\Delta t)$.

13. The fuel cell control program according to claim 1, wherein the Procedure E comprises:

(a) Procedure $E_{71}$ of setting a flow rate $Q_{ca}(t+\Delta t)$ of a cathode gas at the time $(t+\Delta t)$ to be smaller than that under the $\varphi^{ref}(t+\Delta t)$ when a concentration of the radical scavenging ion or the radical generating ion on a cathode side is higher than that on an anode side, (b) Procedure $E_{72}$ of setting the flow rate $Q_{ca}(t+\Delta t)$ of the cathode gas at the time $(t+\Delta t)$ to be larger than that under the $\varphi^{ref}(t+\Delta t)$ when a concentration of the radical scavenging ion or the radical generating ion on the anode side is higher than that on the cathode side, (c) Procedure $E_{81}$ of setting a flow rate $Q_{an}(t+\Delta t)$ of an anode gas at the time $(t+\Delta t)$ to be larger than that under the $\varphi^{ref}(t+\Delta t)$ when the concentration of the radical scavenging ion or the radical generating ion on the cathode side is higher than that on the anode side, and/or (d) Procedure $E_{82}$ of setting the flow rate $Q_{an}(t+\Delta t)$ of the anode gas at the time $(t+\Delta t)$ to be smaller than that under the $\varphi^{ref}(t+\Delta t)$ when the concentration of the radical scavenging ion or the radical generating ion on the anode side is higher than that on the cathode side.

14. The fuel cell control program according to claim 13, wherein the Procedures $E_{71}$ and $E_{72}$ each comprise a procedure of setting the $Q_{ca}(t+\Delta t)$ by using the following equation (10):

[Math. 8]

$$Q_{ca}(t+\Delta t) = Q_{ca}^{ref}(t+\Delta t) + f_Q^{ca}(C_s(z,t), C_g(z,t)) \quad (10)$$

wherein, the $f_Q^{ca}(C_s(z,t), C_g(z,t))$ is a change margin of the flow rate of the cathode gas determined depending on a concentration of the radical scavenging ion or a concentration of the radical generating ion on a cathode-side surface or anode-side surface of the electrolyte membrane, and the $Q_{ca}^{ref}(t+\Delta t)$ is a reference flow rate of the cathode gas included in the reference operation condition $\varphi^{ref}(t+\Delta t)$.

15. The fuel cell control program according to claim 13, wherein the Procedures $E_{81}$ and $E_{82}$ each comprise a procedure of setting the $Q_{an}(t+\Delta t)$ by using the following equation (11):

[Math. 9]

$$Q_{an}(t+\Delta t) = Q_{an}^{ref}(t+\Delta t) + f_Q^{an}(C_s(z,t), C_g(z,t)) \quad (11)$$

wherein, the $f_Q^{an}(C_s(z,t), C_g(z,t))$ is a change margin of the flow rate of the anode gas determined depending on a concentration of the radical scavenging ion or a concentration of the radical generating ion on a cathode-side surface or anode-side surface of the electrolyte membrane, and $Q_{an}^{ref}(t+\Delta t)$ is a reference flow rate of the anode gas included in the reference operation condition $\varphi^{ref}(t+\Delta t)$.

16. The fuel cell control program according to claim 1, wherein the Procedure A comprises:

(a) a procedure of estimating the $C_g(z,t)$ and the $C_s(z,t)$ by using a metal ion transport equation, or (b) a procedure of estimating the $C_g(z,t)$ and the $C_s(z,t)$ by using a first map showing a relation between a reference operation condition $\varphi^{ref}(t)$ at the time t and a concentration $C_g^{ref}(z,t)$ of the radical generation ion and a concentration $C_s^{ref}(z,t)$ of the radical scavenging ion under a steady state (dC/dt=0) of the $\varphi^{ref}(t)$ and a second map showing a relation between the reference operation condition $\varphi^{ref}(t)$ and a time constant $\tau$ of metal ion transport.

17. A fuel cell system, comprising:

a polymer electrolyte fuel cell, a secondary battery for storing a surplus power generated by the polymer electrolyte fuel cell, and a control device for controlling operation of the polymer electrolyte fuel cell and the secondary battery, wherein the control device has, housed therein, the fuel cell control program as claimed in claim 1.

* * * * *